(12) United States Patent  (10) Patent No.: US 9,270,006 B2
Ohashi et al.  (45) Date of Patent: Feb. 23, 2016

(54) WAVEGUIDE DEVICE, COMMUNICATION MODULE AND ELECTRONIC DEVICE

(75) Inventors: Sho Ohashi, Kanagawa (JP); Kenji Komori, Kanagawa (JP); Takahiro Takeda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 39 days.

(21) Appl. No.: 13/984,984

(22) PCT Filed: Feb. 7, 2012

(86) PCT No.: PCT/JP2012/052746
§ 371 (c)(1),
(2), (4) Date: Aug. 12, 2013

(87) PCT Pub. No.: WO2012/111484
PCT Pub. Date: Aug. 23, 2012

(65) Prior Publication Data
US 2013/0321089 A1  Dec. 5, 2013

(30) Foreign Application Priority Data
Feb. 18, 2011 (JP) ................ 2011-0033060

(51) Int. Cl.
 *H01P 5/02* (2006.01)
 *H01P 5/12* (2006.01)
 *H04B 10/25* (2013.01)
(52) U.S. Cl.
 CPC . *H01P 5/12* (2013.01); *H04B 10/25* (2013.01)

(58) Field of Classification Search
 CPC ............................. H01P 5/107; H01P 11/001
 USPC ............... 333/137, 248, 1, 37, 254–256, 260
 See application file for complete search history.

(56) References Cited

U.S. PATENT DOCUMENTS

| 5,488,380 A * | 1/1996 | Harvey et al. ............. 342/368 |
| 7,310,468 B2 * | 12/2007 | Kittaka et al. ............. 385/131 |
| 7,463,797 B2 * | 12/2008 | Hamada ..................... 385/17 |
| 7,881,689 B2 * | 2/2011 | Leblanc et al. ............ 455/300 |
| 2010/0074810 A1 * | 3/2010 | Lee ........................ 422/186.29 |

FOREIGN PATENT DOCUMENTS

| JP | 07-202761 | 8/1995 |
| JP | 2004-007448 | 1/2004 |
| JP | 2005-204221 | 7/2005 |
| JP | 2005-223411 | 8/2005 |
| JP | 2006-094429 | 4/2006 |
| JP | 2007-159082 | 6/2007 |

* cited by examiner

*Primary Examiner* — Dinh Le
(74) *Attorney, Agent, or Firm* — Hazuki International, LLC

(57) ABSTRACT

An electronic device includes a central control unit and a waveguide device. The waveguide device includes a communication module having a communication function, and an attachment/detachment unit capable of attaching/detaching a high-frequency signal waveguide so that coupling between the module and the high-frequency signal is possible. The communication module includes a communication device, and a transfer structure configured to cause a high-frequency signal emitted from the communication device to be coupled to the high-frequency signal waveguide.

17 Claims, 15 Drawing Sheets

FIG. 1
< MODULE AND HIGH-FREQUENCY SIGNAL WAVEGUIDE
ARRANGEMENT POSITION: TILING PROCESS >
(A) ARRANGEMENT POSITION OF HIGH-FREQUENCY SIGNAL WAVEGUIDE
(A1) 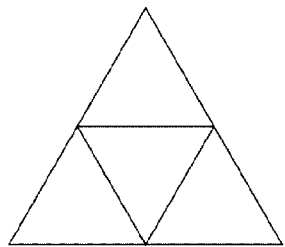
(A2) 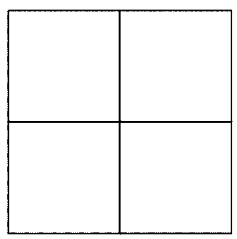
(A3) 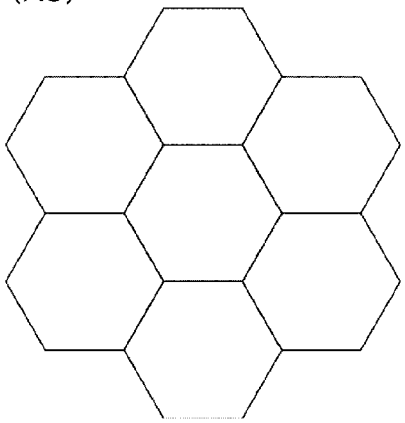
(B) MODULE ARRANGEMENT POSITION
(B1) 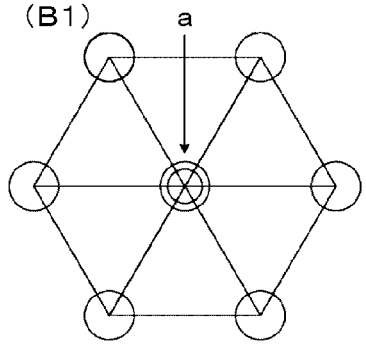
(B2) 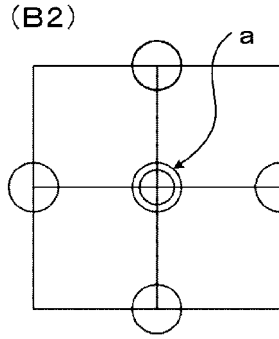
(B3) 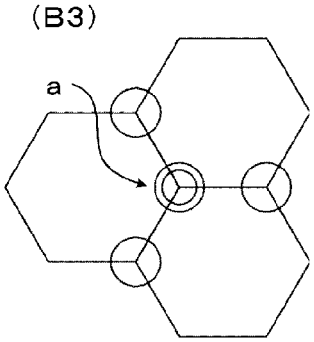
(C) 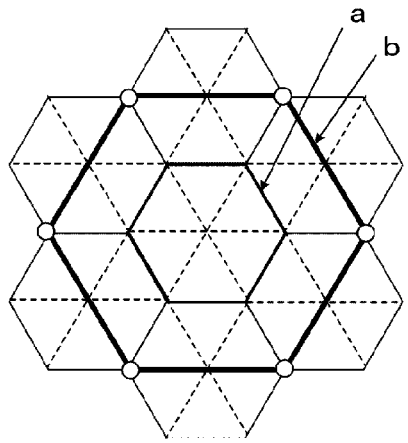

FIG. 4
(A)
1Z SIGNAL TRANSMISSION DEVICE (COMPARATIVE EXAMPLE)
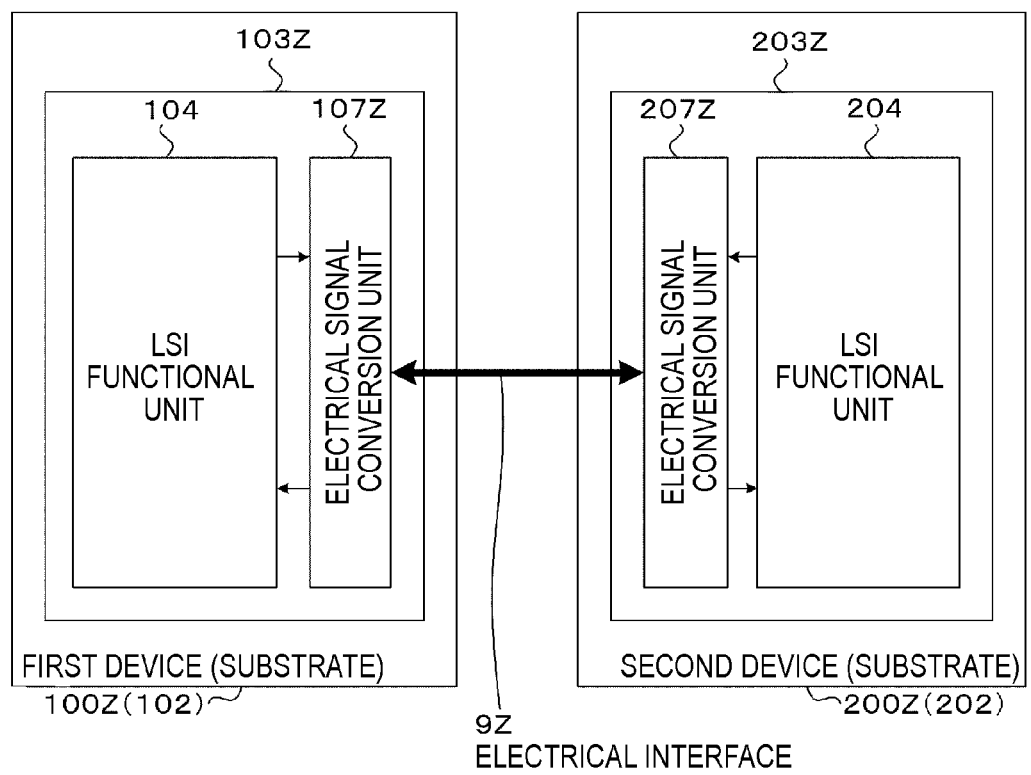
(B)
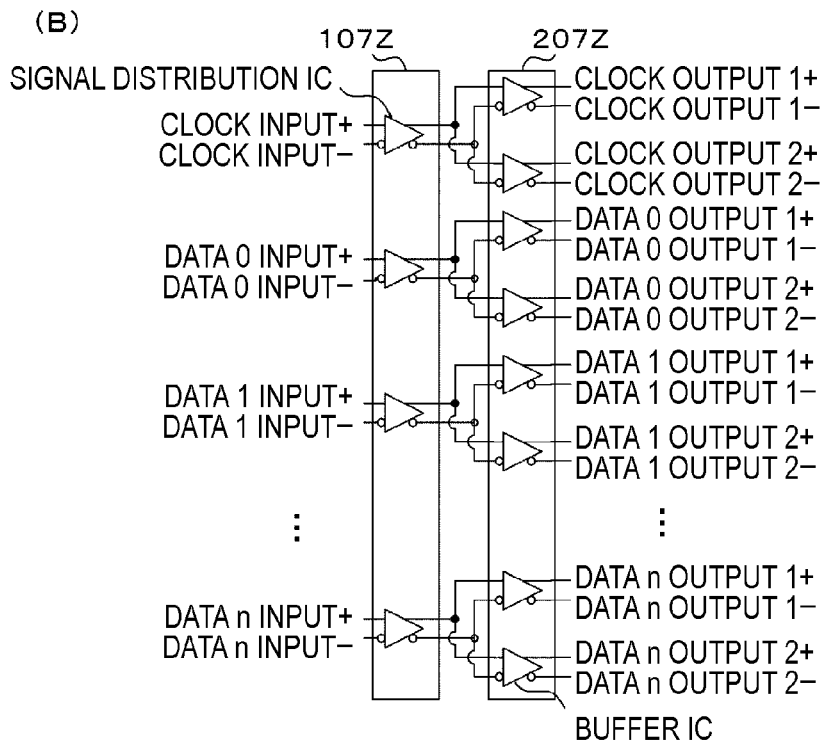

FIG. 5
< SIGNAL PROCESSING MODULE >
(A) FIRST EXAMPLE
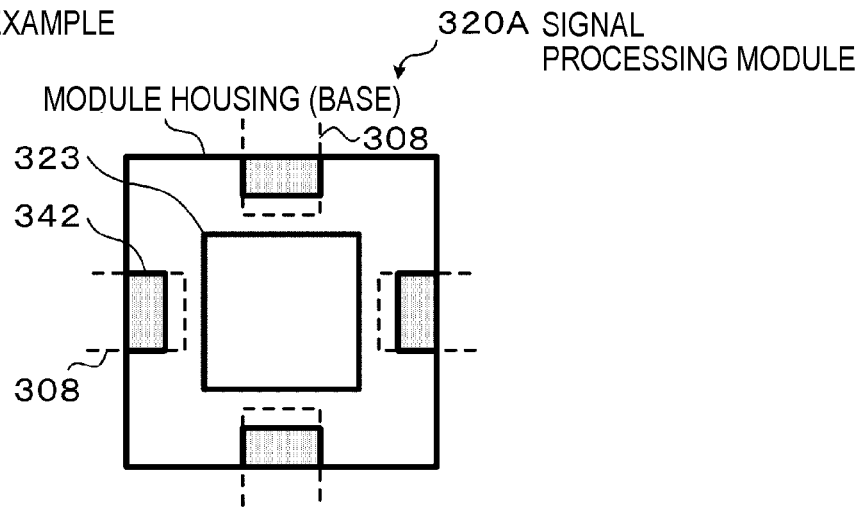
(B) SECOND EXAMPLE
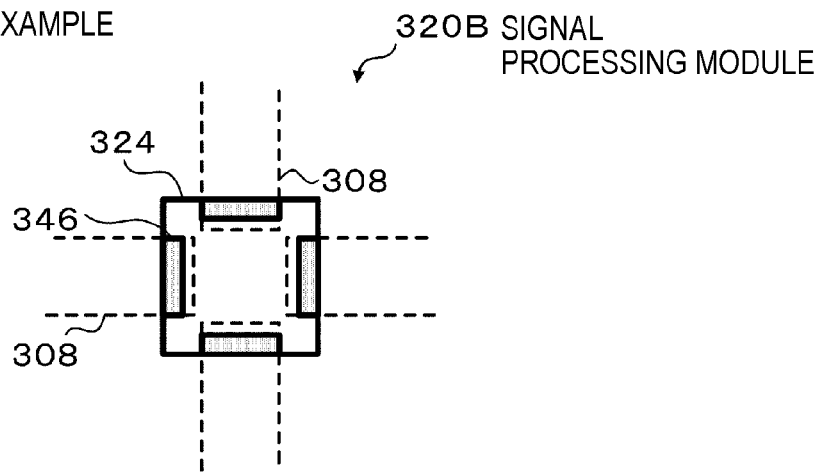
(C) THIRD EXAMPLE
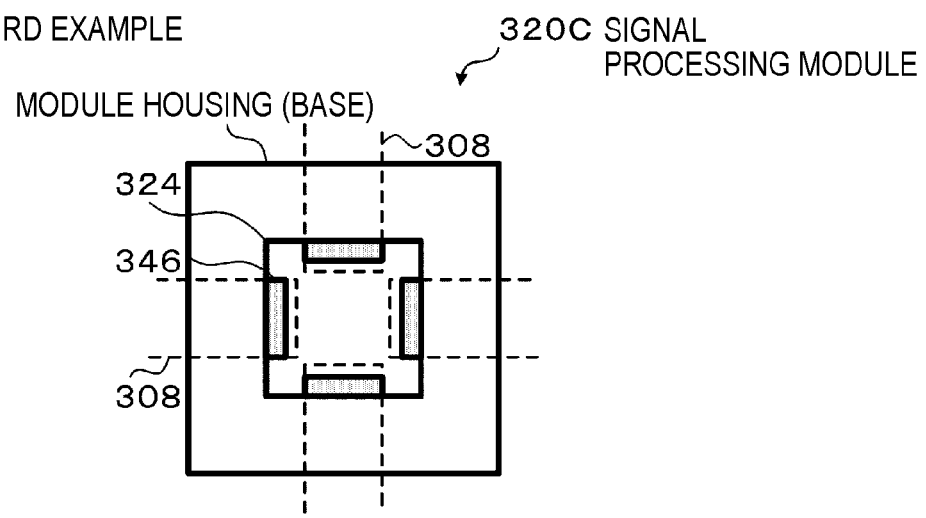

FIG. 6
< SIGNAL PROCESSING MODULE >
(A) FOURTH EXAMPLE
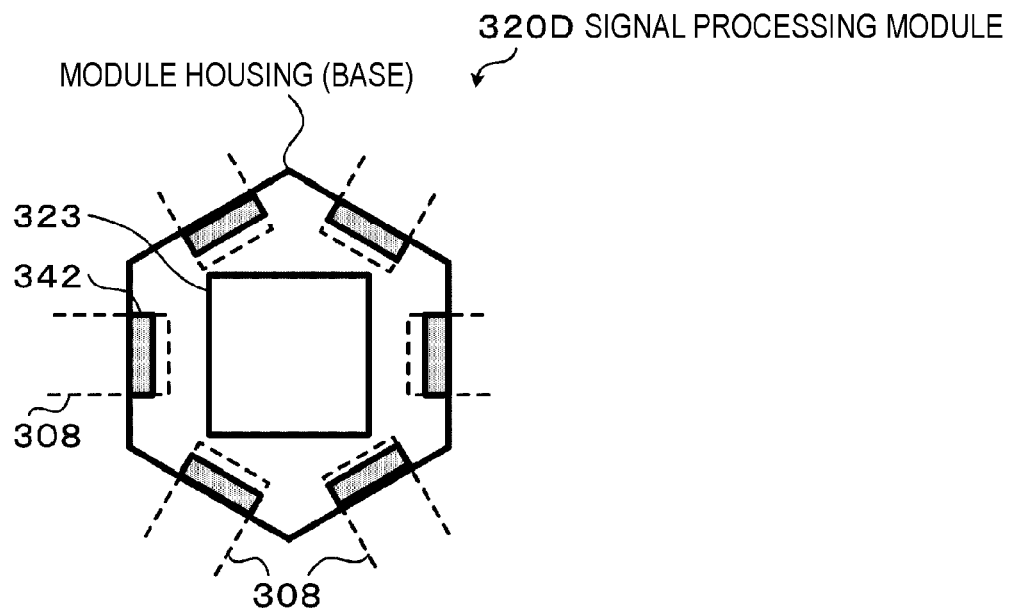
(B) FIFTH EXAMPLE
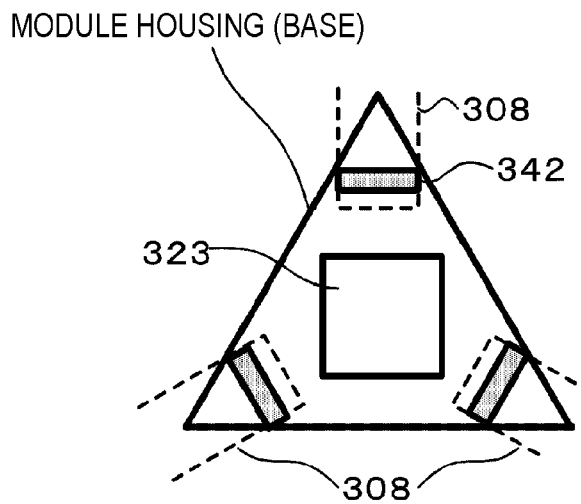

FIG. 7
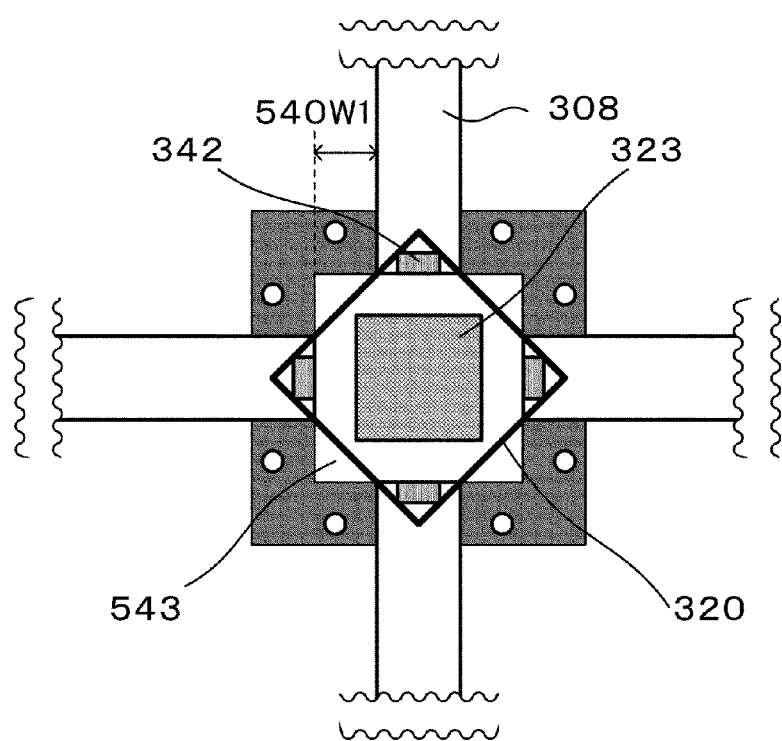
(A)
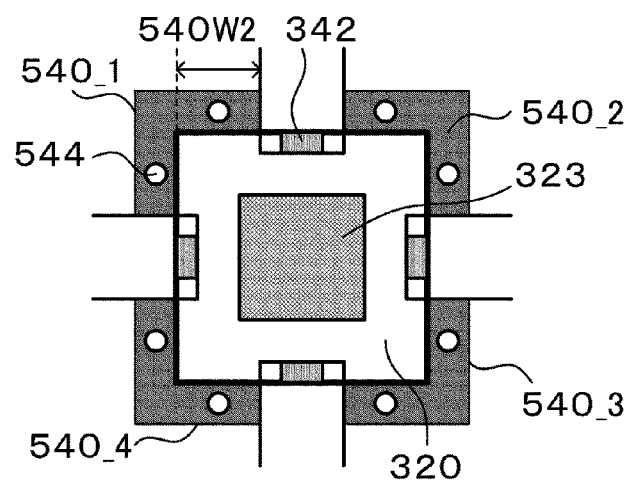
(B)

FIG. 8
(A) DIRECTIVITY: HORIZONTAL DIRECTION
(A1) SIDE VIEW
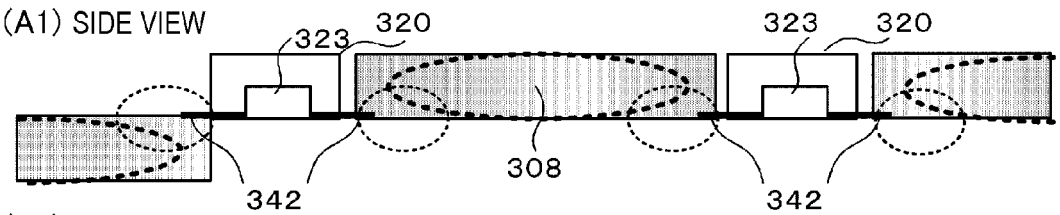
(A2) TOP VIEW
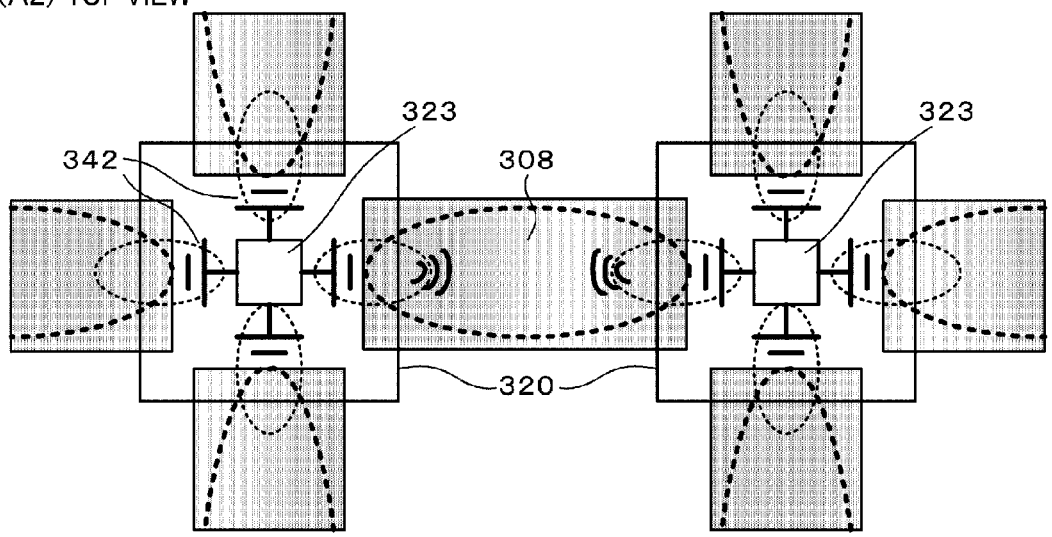
(B) DIRECTIVITY: VERTICAL DIRECTION
(B1) SIDE VIEW
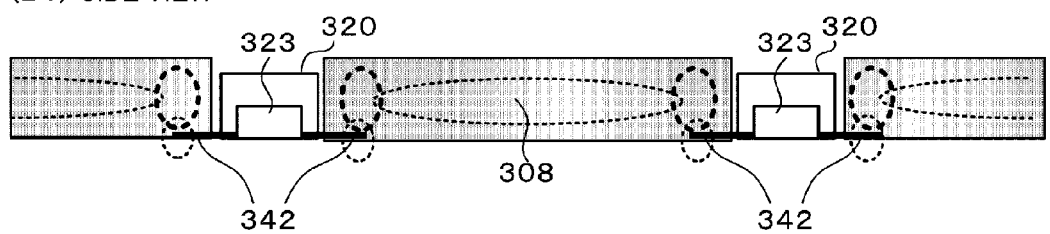
(B2) TOP VIEW
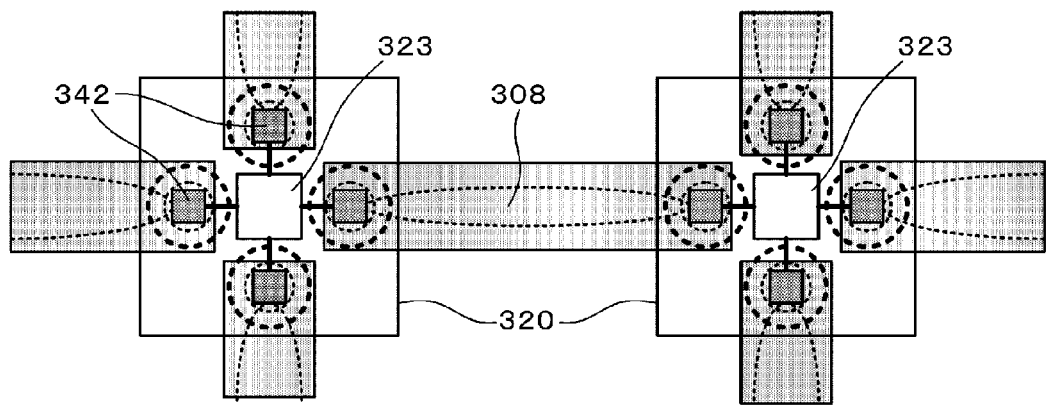

FIG. 9
(A) FIRST EXAMPLE (CONNECTION WAVEGUIDE)
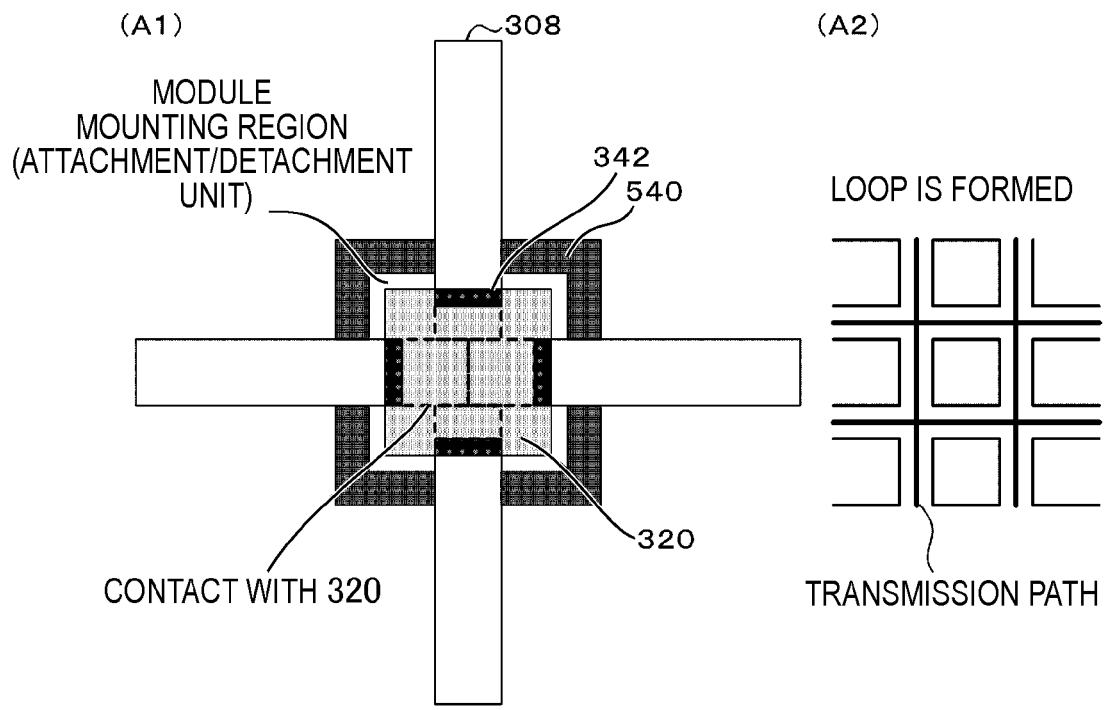
(B) SECOND EXAMPLE
    (WAVEGUIDE CORRESPONDING TO COMMUNICATION NETWORK)
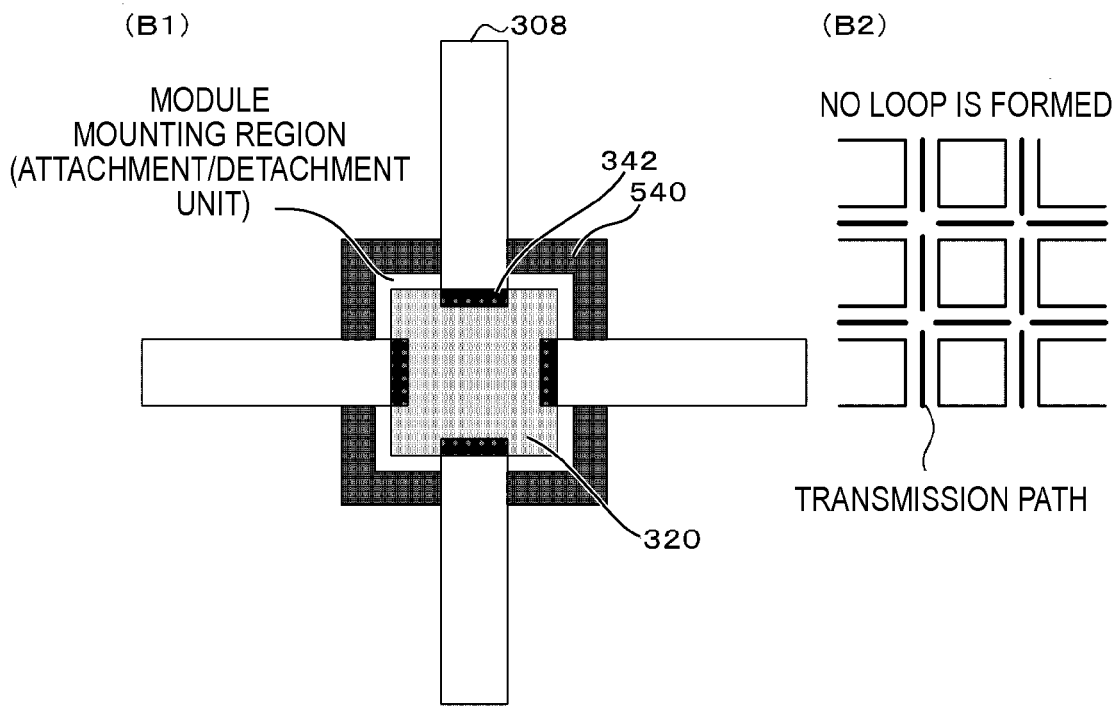

FIG. 10
< MULTILANE: PARALLEL ARRANGEMENT >
(A) FIRST EXAMPLE
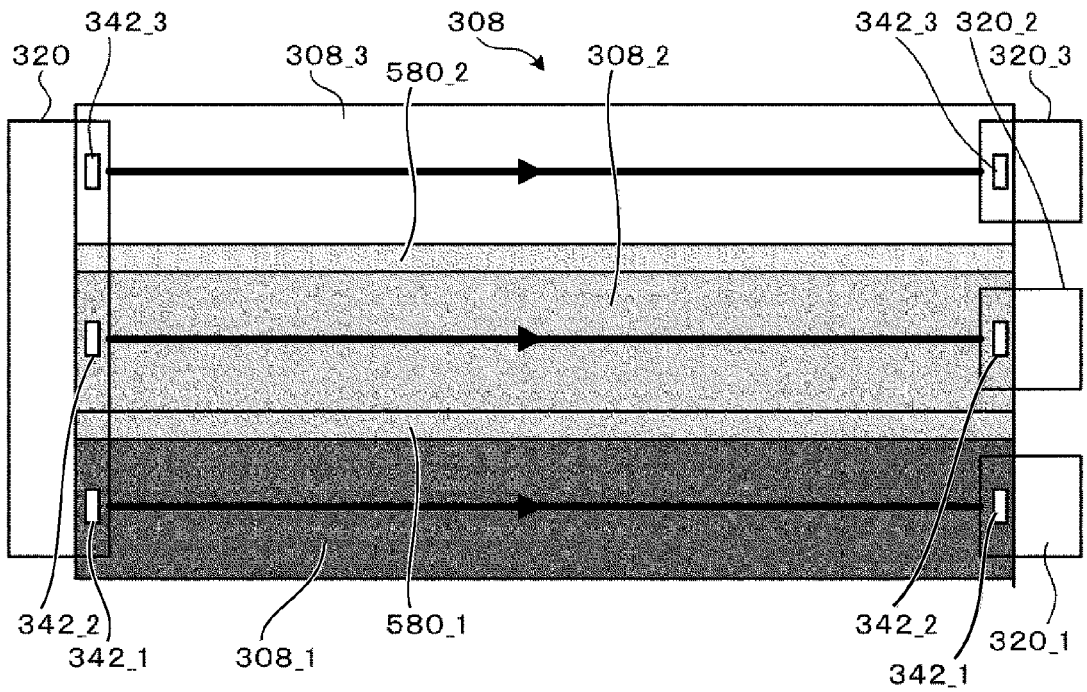
(B) SECOND EXAMPLE
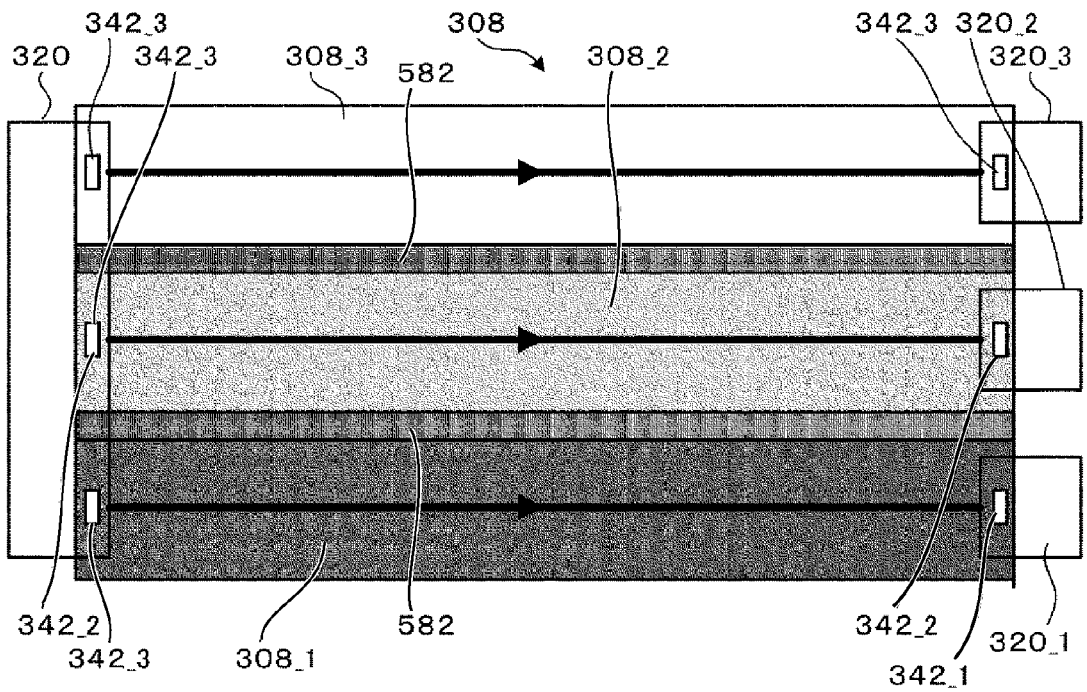

FIG. 11
< MULTILANE: LAMINATION >
(A) FIRST EXAMPLE
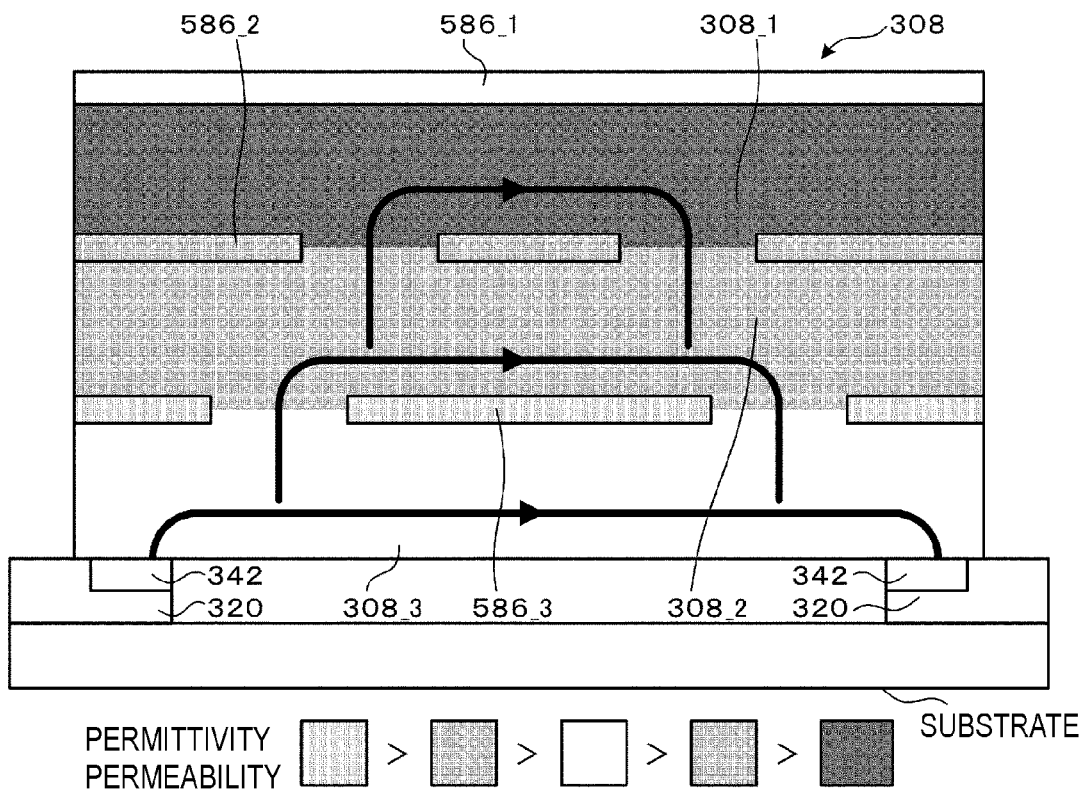
(B) SECOND EXAMPLE
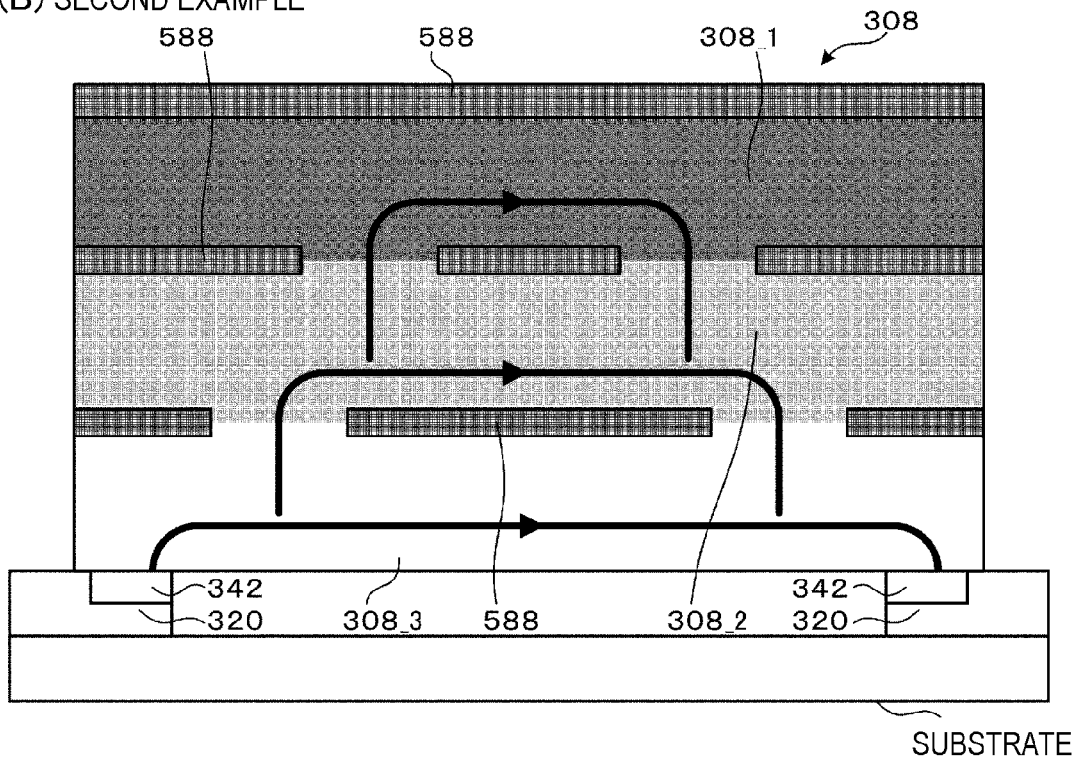

WAVEGUIDE DEVICE, COMMUNICATION MODULE AND ELECTRONIC DEVICE

TECHNICAL FIELD

Technology disclosed in this specification relates to a waveguide device, a communication module, and an electronic device.

BACKGROUND ART

For example, when information is exchanged between semiconductor integrated circuits (ICs) within an electronic device, a connection is typically made using electrical wiring. As a technique of implementing high-speed signal transmission within the electronic device, for example, low-voltage differential signaling (LVDS) is known. However, with a recent further increase in the volume and speed of transmission data, increased power consumption, increased influence of signal distortion due to reflections and the like, increased unnecessary radiation, and the like, are problematic. For example, when video signals (including image signals) or signals of computer images or the like are transmitted at a high speed (in real time) within a device, LVDS has been reaching a limit.

In order to cope with the problems of the increased speed of transmission data, there is a method of increasing the number of wirings and parallelizing signals to reduce the transmission rate per signal line. However, this results in an increased number of input/output terminals. As a result, it is necessary to make a printed board or cable wiring more complex, increase the semiconductor chip size, and the like. Further, when high-speed/large-volume data is routed using wirings, so-called electromagnetic field disturbance becomes problematic.

All of the problems with the LVDS and the method of increasing the number of wirings result from the transmission of signals by electrical wiring. Therefore, as a technique of solving the problems resulting from the transmission of signals by electrical wiring, a technique of making electrical wiring wireless for transmission is proposed.

For example, as proposed in JP 2005-204221A and JP 2005-223411A, wireless signal transmission within a housing is performed and an ultra-wide band (UWB) communication scheme is applied.

CITATION LIST

Patent Literature

Patent Literature 1: JP 2005-204221A
Patent Literature 2: JP 2005-223411A

SUMMARY OF INVENTION

Technical Problem

However, it is difficult to appropriately perform data transmission under an influence of reflection or the like due to a housing or a member within the housing when a general wireless scheme (wireless communication technique) as used in an outdoor field is applied, and there is a problem to be solved because suppression of unnecessary radiation for an electronic member or the like is also necessary.

It is desirable to provide technology capable of performing high-speed or large-volume data transmission while suppressing an influence of a member or an influence on a member.

Solution to Problem

According to a first aspect of the present disclosure, there is provided a waveguide device including: a module having a communication function, and an attachment/detachment unit capable of attaching/detaching a high-frequency signal waveguide so that coupling between the module and the high-frequency signal is possible. Each waveguide device disclosed in the dependent claims according to the first aspect of the present disclosure prescribes a further specific advantageous example of the waveguide device according to the first aspect of the present disclosure. A module can be added and arranged (mounted) on the attachment/detachment unit as well as the high-frequency signal waveguide, and the arranged module can be replaced with another module (this is referred to as a module replacement).

According to a second aspect of the present disclosure, there is provided a module capable of being mounted on the mounting unit according to claim 1, including: a communication device; and a transfer structure configured to cause a high-frequency signal emitted from the communication device to be transferred to the high-frequency signal waveguide.

According to a third aspect of the present disclosure, there is provided an electronic device including: a module having a communication function, and an attachment/detachment unit capable of attaching/detaching a high-frequency signal waveguide so that coupling between the module and the high-frequency signal is possible; and a control unit configured to change configuration information based on the module coupled to the high-frequency signal waveguide, and to control data transmission according to the changed configuration information. In short, when the high-frequency signal waveguide is mounted in a mounting region (the attachment/detachment unit) of the waveguide device according to the first aspect of the present disclosure so as to accomplish coupling of a high-frequency signal among modules, the previous device configuration and situation are changed. When a communication process is performed in the previous configuration aspect the communication process with a module newly to be connected is inappropriate, or it is difficult to appropriately use a newly mounted module. Accordingly, the communication process of each module is controlled so that it is suitable for a change of a module combination configuration. For example, the control unit manages configuration information before and after the new module is coupled to the high-frequency signal waveguide, and controls data transmission according to changed configuration information. For example, before a certain module is arranged on the attachment/detachment unit and arranged in the vicinity of the high-frequency signal waveguide, configuration information indicating that a first function is implemented is provided by performing data transmission between existing modules. When the new module is coupled to the high-frequency signal waveguide in this state, it is also possible to perform data transmission to and from the new module. Using the data transmission, a change to configuration information indicating that the new function can be implemented is made. Accordingly, by controlling the data transmission according to the changed configuration information, a new function can be implemented using the newly coupled module. In the electronic device according to the third aspect of the present disclosure, various technologies/techniques applied to the waveguide device according to the first aspect of the present disclosure (technologies/techniques of each waveguide device disclosed in the dependent claims of the waveguide device according to the first aspect of the present disclosure) are similarly applicable.

In accordance with the waveguide according to the first aspect of the present disclosure, the module according to the second aspect of the present disclosure, and the electronic device according to the third aspect of the present disclosure, it is possible to perform high-speed or large-volume data transmission while suppressing an influence of a member or an influence on a member because the data transmission can be performed via a high-frequency signal waveguide.

BRIEF DESCRIPTION OF DRAWINGS

FIGS. 1(A) to 1(C) are diagrams illustrating a tiling process which determines a basic arrangement form of a waveguide and a module in the course of configuring a waveguide device of this embodiment.

FIGS. 4(A) and 4(B) are diagrams illustrating a signal interface of a signal transmission device of a comparative example from the point of view of a functional configuration.

FIGS. 5(A) to 5(C) are diagrams (part 1) illustrating a configuration example of a signal processing module having a communication function.

FIGS. 6(A) and 6(B) are diagrams (part 2) illustrating the configuration example of the signal processing module having the communication function.

FIGS. 7(A) and 7(B) are diagrams illustrating an example of a method of fixing a high-frequency signal waveguide.

FIGS. 8(A) and 8(B) are diagrams illustrating relationships among directivity of a high-frequency signal coupling structure, a degree of electromagnetic coupling with the high-frequency signal waveguide, and a high-frequency signal transmission direction.

FIGS. 9(A) and 9(B) are diagrams illustrating a technique of coping with a communication network.

FIGS. 10(A) and 10(B) are diagrams illustrating a first example (horizontal arrangement) of coping with multilane.

FIGS. 11(A) and 11(B) are diagrams illustrating a second example (vertical lamination) of coping with multilane.

DESCRIPTION OF EMBODIMENTS

Figure 2:
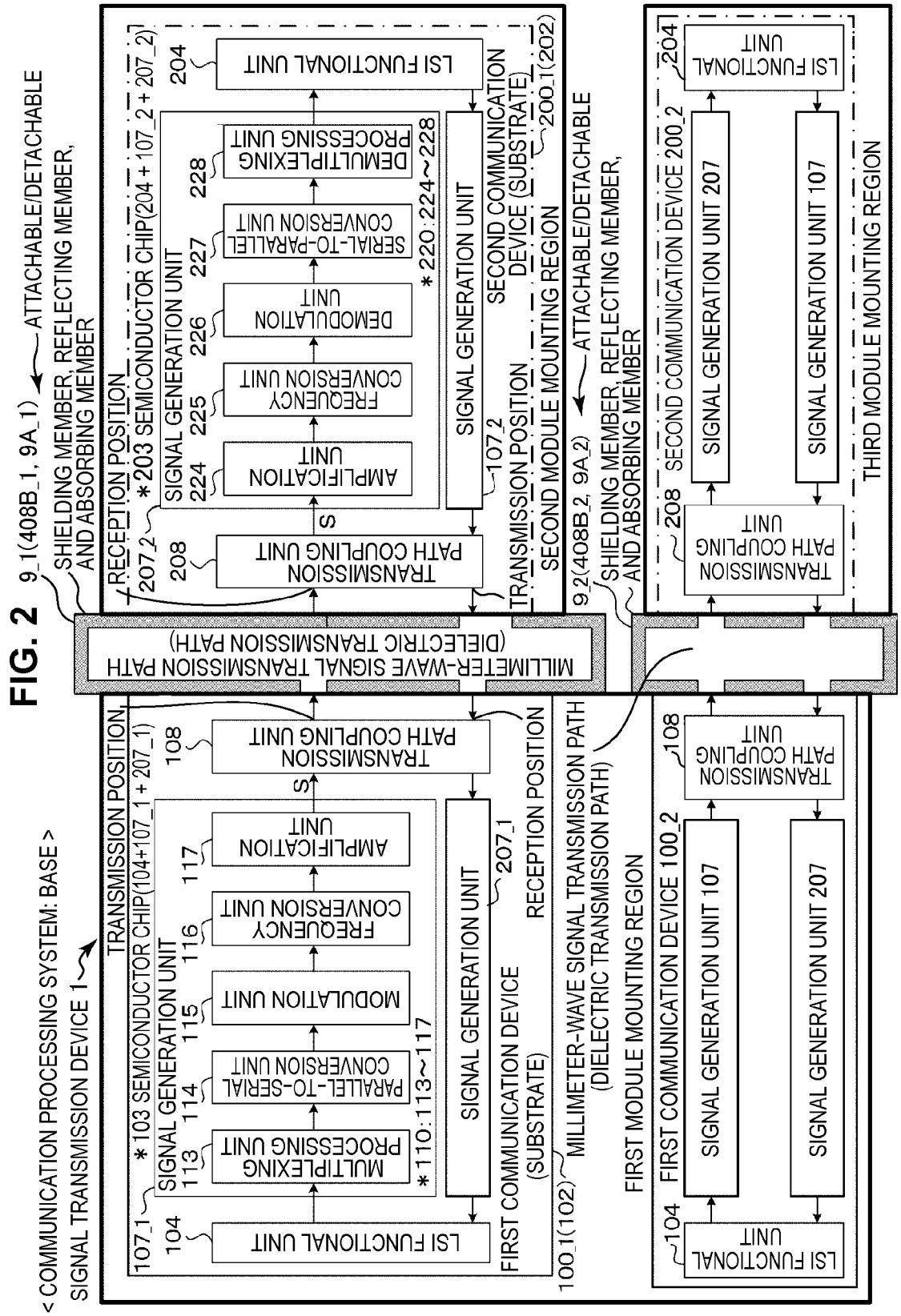
FIG. 2 is a diagram illustrating a base of a functional block diagram focused on a communication process in the waveguide device of this embodiment.

Hereinafter, embodiments of technology disclosed in this specification will be described in detail with reference to the drawings. When functional elements are distinguished from one another with respect to forms, the functional elements are distinguished by adding a reference character, "_n" (n: number), or a combination of these suffixes. On the other hand, when the functional elements are described without particular need to distinguish them from one another, such suffixes are omitted from the description. This also applies to the drawings.

Description will be given in the following order.
1. Overall outline
2. Basic configuration of waveguide device
  Tiling
  Communication processing system: base
  Millimeter-wave signal transmission path
  Connection and operation
  Communication processing system: relay
  Comparative example
3. Signal processing module
  Rectangle/triangle/hexagon, method of fixing high-frequency signal waveguide, and directivity
4. Coping with communication network
5. Coping with multilane: parallel arrangement and lamination
6. Specific application example
  Embodiment 1: module arrangement in regular square shape and two-dimensional shape
  Embodiment 2: module arrangement in regular square shape and two-dimensional shape+relay module
  Embodiment 3: module arrangement in regular triangle shape and two-dimensional shape
  Embodiment 4: module arrangement in regular square shape and three-dimensional shape
  <Overall Outline>
  [Waveguide Device, Electronic Device, and Module]

First, basic particulars will be described hereinafter. In the waveguide device, the module installed in the waveguide device, a method of producing the waveguide device, and the electronic device using the waveguide device disclosed in this specification, for example, a high-frequency signal waveguide including a dielectric or magnetic material is arranged within a housing and a module with a communication function is mounted on the high-frequency signal waveguide, so that communication of a high-frequency signal transmitted through the high-frequency signal waveguide is established. The high-frequency signal waveguide is arranged at a predetermined position. In this case, a module mounting unit is provided. A transmission network, an electronic device, or the like is configured by mounting a module having the communication function in the mounting unit.

Thereby, for high-speed data transmission, intra-device communication or inter-device communication is implemented by reducing multipath, transmission degradation, unnecessary radiation, and the like. By additionally mounting a communication processing module having a communication function in a high-frequency signal waveguide, it can be performed without burdens, such as design change, increase in a substrate area, and increase in cost, associated with a configuration change such as a functional extension. That is, a high-frequency signal waveguide capable of transmitting electromagnetic waves such as millimeter waves with low loss is arranged within a device and a communication processing module having a communication function is placed, if necessary, so that data transmission between an existing communication processing module and an added communication processing module is implemented by transmitting electromagnetic waves such as millimeter waves through the inside of the high-frequency signal waveguide. It is possible to add a communication processing module without making a design change in a main board or the like due to a configuration change, such as function addition.

In the arrangements of a high-frequency signal waveguide and a coupler (a transfer structure having a function of transferring a high-frequency signal) for connection of electrical wiring, a significant degree of error (several millimeters to several centimeters) can be allowed without specifying the pin arrangement or the contact position as in a connector of the electrical wiring. Because loss of electromagnetic waves can be reduced for a wireless connection, it is possible to reduce power of a transmitter, simplify a configuration of a reception side, and suppress interference of radio waves from outside of a device or reverse-radiation to the outside of the device.

Because a transmission target signal is converted into a high-frequency signal and the high-frequency signal is transmitted, high-speed transmission is possible. The high-frequency signal waveguide is used, so that coupling is good. Because loss is small, power consumption is small. It is only necessary to arrange a signal processing module to be in the vicinity of or in contact with the high-frequency signal waveguide having a function of transferring a high-frequency signal. A connection of transmission/reception is simple, and a connection is possible in a broad range. Easily available plastic can be used as the high-frequency signal waveguide, and the waveguide device and the electronic device can be cheaply configured. Because the high-frequency signal is confined to the high-frequency signal waveguide, the influence of multipath is small and a problem of EMC is also small.

Because a structural element is interchangeable if the waveguide device in which the signal processing module is replaceable is provided in the electronic device, a replacement or extension of an arbitrary circuit connected to a millimeter-wave transceiver is possible. For example, because multi-transmission is also possible in a waveguide of one lane, the efficiency of transmission capacity for the same area is improved. An arrangement form of the high-frequency signal waveguide constituting the waveguide device may be a three-dimensional shape as well as a planar shape. Also, a transparent member can be used as the high-frequency signal waveguide, and design options such as a three-dimensional structure or a transparent transmission structure can be broadened.

For example, in the case of a connection (metal wiring connection) in general electrical wiring, a connection to a transmission medium is fixed by a pad or the like with high accuracy. In this case, a communicable volume is limited according to a characteristic. It is further difficult to form a multilane structure due to a problem of an increase in an area or cost associated with an increase in an input/output mechanism. Also, it is necessary to design wiring according to an individual chip or module, and time and effort are necessary. On the other hand, in the case of a wireless connection to be applied to an outdoor field, a positional relationship in an antenna is free in a connection to the transmission medium. However, because radio waves are transmitted through a space, propagation loss is large and a communication range is limited. Also, when the above-described wireless transmission is directly applied to intra-device communication, a propagation situation depends upon an individual housing form and the estimation of a transmission state is time-consuming. Also, the suppression of unnecessary radiation is necessary, and there are particulars to be solved such as difficulty in a multilane structure from a problem of mutual interference.

On the other hand, in the waveguide device of this embodiment, it is not necessary for a communication device and a high-frequency signal waveguide to have a special mechanism in a connection portion or only a simple mechanism is available, and large-volume communication is possible. Using this point, it is possible to configure a network in which arbitrary attachment/detachment of a high-frequency signal communication device is possible and a combination of communication devices is interchangeable.

For example, a high-frequency signal waveguide formed of a dielectric material or a magnetic material is used, so that transmission loss can be further reduced than in the case of a free space. Also, because a high-frequency signal can be confined and transmitted within the high-frequency signal waveguide, a problem such as reflection or unnecessary radiation due to a member within the device is improved, and a multilane structure is also quite feasible. Because it is possible to apply time division multiplexing or frequency division multiplexing (in which a plurality of frequencies propagate within a single waveguide) as in general communication, transmission capacity efficiency is improved. An arrangement form of the high-frequency signal waveguide has a uniform pattern, so that a network configuration can be easily designed.

For example, in the waveguide device of this embodiment corresponding to the waveguide device according to the first aspect of the present disclosure, a module having a communication function is arranged at a predetermined position. In this case, an attachment/detachment unit (hereinafter also referred to as a module mounting region or a mounting unit) capable of attaching/detaching the high-frequency signal waveguide is provided. In the attachment/detachment unit, the module itself is preferably attachable and detachable. The waveguide device of this embodiment corresponding to the electronic device according to the third aspect of the present disclosure includes a control unit configured to change configuration information based on the module coupled to the high-frequency signal waveguide, and to control data transmission according to the changed configuration information. The waveguide device corresponds to the case in which no control unit is provided. Although the control unit will be described in detail, for example, data transmission is controlled to be performed between modules suitable for a changed combination configuration if it is recognized that the module combination configuration has been changed. Because a device configuration is changed from the previous device configuration when the module is mounted on the attachment/detachment unit of the waveguide device (including a replacement) and a coupling of the high-frequency signal is accomplished in the high-frequency signal waveguide, a communication process of each module is controlled to be suitable for a change in the module combination configuration. The high-frequency signal waveguide is not limited to an integrated one, and for example, the entire high-frequency signal waveguide can be configured by combining a plurality of waveguides.

Preferably, the attachment/detachment unit is provided at a plurality of positions. Thereby, it is possible to cope with various changes in a device configuration.

When a high-frequency signal waveguide is configured, for example, it is not limited to an integrated one. The entire high-frequency signal waveguide can be configured by combining a plurality of waveguides. That is, a plurality of high-frequency signal waveguides can be coupled to one attachment/detachment. In short, the latter is a form in which the entire high-frequency signal waveguide is configured by combining a plurality of waveguides like blocks. When the entire high-frequency signal waveguide is configured by combining the plurality of waveguides, a size or a shape corresponding to a size or an arrangement of a waveguide or module is used for each member. Here, in the waveguide device of this embodiment, preferably, it is desirable to configure a communication network. When the communication network is configured, it is preferred to decouple a high-frequency signal in the attachment/detachment unit. For example, when the entire high-frequency signal waveguide is configured by coupling the plurality of high-frequency signal waveguides to the attachment/detachment unit (by combining a plurality of waveguides), it is only necessary for the attachment/detachment unit to decouple the transmission path by causing a plurality of high-frequency signal waveguides not to be in contact, so that the high-frequency signal is decoupled. In the case of the integrated high-frequency signal waveguide, it is only necessary to decouple the transmission path by gouging out a portion of the attachment/detachment unit so that the high-frequency signal is decoupled.

Further, although it is convenient to configure the communication network when the high-frequency signal is decoupled in the portion of the attachment/detachment unit, it is difficult to directly perform data transmission over the adjacent attachment/detachment unit. As a countermeasure against this, it is only necessary to mount a relay module having a data relay function in the attachment/detachment unit in which a high-frequency signal waveguide is decoupled (a plurality of high-frequency signal waveguides are coupled but do not come in contact, or the portion of the attachment/detachment unit of the integrated high-frequency signal waveguide is gouged out and the transmission path is decoupled). In the attachment/detachment unit in which a module having a normal communication function is mounted, it is only necessary for the module to be responsible for a function of the relay module. Incidentally, it is also preferred for the relay module to be responsible for a function of the control unit.

In the high-frequency signal waveguide, the number of waveguides (transmission paths) connected to the attachment/detachment unit is not limited to one, and a plurality of independent transmission paths may be provided (to be so-called multilane). Each member constituting a plurality of independent transmission paths may be formed of either of a dielectric material or a magnetic material. In the plurality of independent transmission paths in the case of the multilane, members constituting the transmission paths may be arranged in parallel (horizontal arrangement), or the members constituting the transmission paths may be laminated (vertical lamination). In the case of the parallel arrangement, a high-frequency signal is coupled to each lane (each transmission path) by an individual transfer structure (coupler), that is, a plurality of lanes of a single layer of a plurality of couplers is configured. On the other hand, in the case of the lamination, a high-frequency signal is coupled to a lane (each transmission path) of an end (a top layer or a bottom layer: normally the top layer) by one transfer structure (coupler). That is, a single lane of a plurality of layers of a single coupler can be configured and vertical lamination can be configured at the same height without an influence of a height.

Here, in the case of the parallel arrangement, the arrangement order of permittivity or permeability is not particularly limited. In some cases, members of the same permittivity or permeability may be arranged. However, when dielectric materials or magnetic materials are merely adjacent to each other, the leakage of a high-frequency signal from a lane of high permittivity or permeability to a lane of low permittivity or permeability can be ignored (total reflection is assumed), but the leakage of a high-frequency signal from a lane of equal or low permittivity or permeability to a lane of high permittivity or permeability occurs. As a countermeasure against this, for example, it is preferred to arrange a member having lower permittivity or permeability than any others between members constituting adjacent transmission paths. Thereby, total reflection can be made in any lane regardless of whether permittivity or permeability of a member constituting each lane is the same or different, and a high-frequency signal can be confined and transmitted within the high-frequency signal waveguide of each lane. Of course, the multilane can be formed by arranging them using a dielectric material or a magnetic material regardless of a magnitude relationship of permittivity or permeability. However, in this case, because the leakage for an adjacent lane occurs when dielectric materials or magnetic materials are merely adjacent to each other, a shielding member, such as a metal member or the like, having a shielding effect may be arranged at a boundary. Thereby, regardless of whether permittivity or permeability of a member constituting each lane is the same or different, a high-frequency signal can be confined and transmitted within the high-frequency signal waveguide of each lane.

On the other hand, in the case of the lamination, it is preferred for magnitudes of permittivities or permeabilities to be different from each other, or for a wall layer (boundary layer) whose permittivity or permeability is different from either of the two to be arranged at a boundary of a member constituting an adjacent transmission path. For example, on the wall layer, a member having higher permittivity or permeability than either of the two is arranged. A high-frequency signal coupling structure, for example, is arranged on the side of highest permittivity or permeability. That is, coupling of a high-frequency signal is accomplished between a member having highest permittivity or permeability among members constituting adjacent transmission paths and a module. A position of coupling of a high-frequency signal to an adjacent lane is formed by providing an opening in part of the wall layer. Of course, in the case of the lamination, a shielding member such as a metal material having a shielding effect may be arranged as a wall layer (boundary layer) at a boundary of a member constituting the lane. In any case, a frequency to be mainly transmitted is changed for every layer with a difference in the compatibility of a frequency and dimensions (thickness and width) in each layer (lane) using a difference in permittivity or permeability. Although full separation is not formed, it is possible to implement good simultaneous transmission of a plurality of carriers.

A planar shape or a three-dimensional shape formed by the high-frequency signal waveguide (i.e., module arrangement) may be predetermined. Thereby, it is possible to guarantee compatibility. Also, when the entire high-frequency signal waveguide is configured by combining a plurality of waveguides, a shape of a component constituting the high-frequency signal waveguide can also be uniformly formed. Even when a dimension of a member of the transmission path constituting the high-frequency signal waveguide is changed, it is possible to guarantee a certain degree of compatibility. For example, a basic shape constituting the planar shape or the three-dimensional shape may be one of a regular triangle, a regular square, and a regular hexagon. Thereby, it is possible to adjust a length of the high-frequency signal waveguide using a basic shape as one unit, or using a two-dimensional shape similar to the basic shape as one unit. In these cases, it is possible to align a length of the high-frequency signal waveguide arranged at a position of a side of a polygon and recognition of transmission characteristics is easy.

In the waveguide device of this embodiment, preferably, when the coupling of the high-frequency signal is accomplished in the high-frequency signal waveguide between modules each having a transfer structure, which couples a high-frequency signal to the high-frequency signal waveguide, data transmission between each of the mounted modules via the transfer structure and the high-frequency signal waveguide is possible.

In the waveguide device of this embodiment, preferably, a control unit configured to change configuration information based on the module coupled to the high-frequency signal waveguide, and to control data transmission according to the changed configuration information, may be included. Alternatively, the control unit may be arranged outside the waveguide device (within the electronic device), and the module having the communication function may be configured to be controlled under the control. For example, the control unit controls data transmission to be performed between modules suitable for a changed combination configuration if it is recognized that the module combination configuration having the communication function has been changed. The control unit, for example, manages configuration information before and after a new module is coupled to the high-frequency signal waveguide, and controls data transmission according to changed configuration information. For example, before a certain module is arranged on the attachment/detachment unit and coupled to the high-frequency signal waveguide, configuration information indicating that a first function is implemented is provided by performing data transmission between existing modules. When the new module is coupled to the high-frequency signal waveguide in this state, it is also possible to perform data transmission to and from the new module. Using the data transmission, a change to configuration information indicating that the new function can be implemented is made. Accordingly, by controlling the data transmission according to the changed configuration information, a new function can be implemented using the newly coupled module.

The control unit may sense an arrangement position of the module having the communication function in the high-frequency signal waveguide. Alternatively, the control unit may sense whether the module having the communication function is coupled to the high-frequency signal waveguide. Preferably, a position where the module is mounted or what is mounted is also recognized. Preferably, it may also be recognized whether a foreign object has been arranged in the module mounting region. It is only necessary to cope with their implementation by predetermining a rule.

[Signal Transmission Device and Signal Transmission Method]

A communication device for performing data transmission is as follows. In this embodiment, there are provided a transmission device that transmits a transmission target signal for a high-frequency signal of a radio-wave frequency band and a reception device that receives the transmission target signal transmitted from the transmission device. Frequency division multiplexing (FDM) or time division multiplexing (TDM) may be applied. The high-frequency signal is transmitted between the transmission device and the reception device via the high-frequency signal waveguide. In detail, when the transmission device and the reception device are arranged at predetermined positions, a high-frequency signal waveguide, which couples a high-frequency signal, is set to be arranged between the transmission device and the reception device. Thereby, it is possible to transmit the high-frequency signal via the high-frequency signal waveguide because the transmission target signal is converted into a high-frequency signal between the transmission device and the reception device. A signal transmission device for the transmission target signal includes a transmission device (transmission-side communication device) that transmits a transmission target signal as a high-frequency signal and a reception device (reception-side communication device) that receives the high-frequency signal transmitted from the transmission device and reproduces the transmission target signal.

The transmission device or the reception device is provided in an electronic device. If both the transmission device and the reception device are provided in each electronic device, it is possible to deal with two-way communication. By mounting electronic devices at predetermined positions, it is possible to perform signal transmission between the two.

The signal transmission device may have an aspect in which only a high-speed or large-volume signal among various transmission target signals is set as a target of conversion into a high-frequency signal of a radio-wave frequency band, and others that are enough for a low speed and a small volume, or a signal regarded to be a direct current, such as a power source, are not set as the conversion target. Further, others that are enough for a low speed and a small volume may also be included in the target of conversion into a high-frequency signal of a radio-wave frequency band. Also, a power source may be transmitted via the high-frequency signal waveguide according to a power supply device and a power reception device. That is, in addition to a high-speed or large-volume signal, others that are enough for a low speed or a small volume may be converted into high-frequency signals and transmitted. Further, it is only necessary to transmit all signals including a power source (power) via the high-frequency signal waveguide by applying wireless power feeding. A signal, which is not a target of transmission in a frequency signal of a radio-wave frequency band, is transmitted through electrical wiring as done previously. Electrical signals of an original transmission target before conversion into a frequency signal of a radio-wave frequency band are collectively referred to as a baseband signal.

Incidentally, it is only necessary to perform power transmission and signal transmission of different signals when wireless power feeding is performed, and a frequency of a power transmission signal may be different from or the same as a frequency of a carrier signal for signal transmission in the limit. From the point of view of preventing an influence of noise or the like due to a power transmission signal, preferably, the frequency of the power transmission signal is different from the frequency of the carrier signal for the signal transmission. It is only necessary for the frequency of the power transmission signal not to overlap a frequency band to be used in wireless communication of information, and various frequencies may be used within this limit. Also, although an applicable modulation scheme is limited, carriers of the signal transmission and the power transmission may be common when degradation of power transmission efficiency is allowed (in this case, the frequency of the power transmission signal is the same as the frequency of a carrier signal for the signal transmission).

If the frequency signal of a radio-wave frequency band is used for signal transmission, there is no problem when electrical wiring or light is used. That is, if the frequency signal of the radio-wave frequency band is used in signal transmission regardless of electrical wiring or light, it is possible to apply wireless communication technology, eliminate difficulty than when electrical wiring is used, and construct a signal interface in a simpler and cheaper configuration than when light is used. From the point of view of a size and cost, it is more advantageous than when light is used. Preferably, in this embodiment, it is preferred to mainly use a carrier frequency of a millimeter-wave band (a wavelength is 1 to 10 millimeters) for signal transmission. However, the present disclosure is not limited to the millimeter-wave band, and is applicable even when a carrier frequency close to the millimeter-wave band, for example, such as a sub-millimeter-wave band having a shorter wavelength (a wavelength is 0.1 to 1 millimeters) or a long centimeter-wave band having a longer wavelength (a wavelength is 1 to 10 centimeters), is used. For example, a range from the sub-millimeter-wave band to the millimeter-wave band, a range from the millimeter-wave band to the centimeter-wave band, or a range from the sub-millimeter-wave band to the millimeter-wave band and the centimeter-wave band may be used. If the millimeter-wave band or its vicinity is used for signal transmission, the necessity of electromagnetic compatibility (EMC) suppression is low, as when electrical wiring (for example, flexible printed wiring) is used for signal transmission without interfering with other electrical wiring. If the millimeter-wave band or its vicinity is used for signal transmission, a data rate is increased more than when electrical wiring (for example, flexible printed wiring) is used, and therefore it is also possible to easily cope with high-speed/high-data-rate transmission such as speed increase of an image signal due to high definition or a high frame rate.

<Basic Configuration of Waveguide Device>

[Tiling: Planar Shape]

FIG. 1 is a diagram illustrating a tiling process which determines a basic arrangement form of a waveguide and a module in the course of configuring a waveguide device of this embodiment. Here, FIG. 1 is a diagram illustrating a basic concept of the tiling process.

When the waveguide device is configured by arranging the waveguide and the module, the arrangement may be free. However, the length of each waveguide is not uniform and the management of transmission characteristics is complex. Accordingly, in this embodiment, it is made easy to manage transmission characteristics by providing regularity. In this case, the tiling process can be applied to only a basic shape satisfying a certain condition.

In order to facilitate understanding, first, the case in which a two-dimensional waveguide device having a waveguide of a single length is configured by arranging the waveguide and the module on a plane will be described. In the tiling process of arranging the waveguide and the module, regular polygons in which the plane can be filled with the waveguide are three polygons of a regular triangle (FIG. 1(A1)), a regular square (FIG. 1(A2)), and a regular hexagon (FIG. 1(A3)). The solid line of the drawing indicates a position at which the waveguide is arranged. A process of representing a state in which the module has been arranged at each vertex on one plane is referred to as a module laying process (tiling process). A basic concept of the tiling process is to arrange a module at a position indicated by O in the drawing as connected to an arrow a with a waveguide when a module has been arranged at a position of the arrow a of the drawing, as illustrated in FIG. 1(B). As a condition that the basic shape can be infinitely arranged (implemented), regular polygons capable of being tiled are three polygons of a regular triangle (FIG. 1(B1)), a regular square (FIG. 1(B2)), and a regular hexagon (FIG. 1(B3)). The basic shape of the module arranged at the vertex of the regular triangle (FIG. 1(B1)) is a regular hexagon (honeycomb shape), the basic shape of the module arranged at the vertex of the regular square (FIG. 1(B2)) is a regular square, and the basic shape of the module arranged at the vertex of the regular hexagon (FIG. 1(B3)) is a regular triangle.

Incidentally, because there is a side of an adjacent basic shape in an extension direction of a side of a certain basic shape in the case of the regular triangle (FIG. 1(A1)) and the regular square (FIG. 1(A2)), it is possible to easily cope with a change in a size using a length of a side of the basic shape as one unit. On the other hand, because there is no side of the adjacent basic shape in the extension direction of the side of the certain basic shape in the case of the regular hexagon (FIG. 1(A3)), it is difficult to directly cope with the change in the size using the length of the side as one unit. As a countermeasure against this, it is only necessary to arrange a waveguide at a position connected to a diagonal line of the regular hexagon as illustrated in FIG. 1(C). Thereby, it is possible to adjust the length of the waveguide using a two-dimensional shape (an arrow b of the drawing) similar to the basic shape (the arrow a of the drawing) as one unit. The length of one side of the illustrated similar two-dimensional shape is twice one unit of the original basic shape. It is possible to cope with the change in the size using the length of the side of the original basic shape as one unit. As can be seen when FIG. 1(A1) and FIG. 1(C) are compared, tiling is possible in the regular hexagon as well as the regular triangle when the basic shape is the regular triangle.

[Expansion into Three-Dimensional Shape]

Although the case in which modules are arranged in a planar shape according to a predetermined basic shape and connected by a transmission path has been described above, this concept may be applied three-dimensionally. In that case, it is possible to configure a waveguide device of a configuration in which the modules arranged in the three-dimensional shape are connected by a waveguide of a single length.

[Communication Processing System: Base]

FIG. 2 is a diagram illustrating a signal interface of the waveguide device of this embodiment from the point of view of a functional configuration. In other words, FIG. 2 is a diagram illustrating a base of a functional block diagram focused on a communication process in the waveguide device of this embodiment.

A signal transmission device 1 is configured so that a first communication device 100, which is an example of a first wireless device, and a second communication device 200, which is an example of a second wireless device, are coupled via a millimeter-wave signal transmission path 9 (an example of a high-frequency signal waveguide 308) and perform signal transmission in a millimeter-wave band. A semiconductor chip 103 corresponding to transmission/reception in the millimeter-wave band is provided in the first communication device 100, and a semiconductor chip 203 corresponding to transmission/reception in the millimeter-wave band is provided in the second communication device 200. The first communication device 100 and the second communication device 200 are mounted on a module mounting region (an example of an addition unit) provided in a predetermined arrangement aspect on a main substrate. The attachment/detachment unit is provided in the module mounting region and the millimeter-wave signal transmission path 9 can be attached/detached so that a high-frequency signal can be coupled to the first communication device 100 or the second communication device 200.

For example, in a first module mounting region, the first communication device 100 is provided in two systems. In a second module mounting region, the second communication device 200 is provided in one system. In a third module mounting region, the second communication device 200 is provided in one system. For a first communication device 100_1 of the first module mounting region and a second communication device 200_1 of the second module mounting region, a connection of a high-frequency signal is made by a first millimeter-wave signal transmission path 9_1. For a first communication device 100_2 of the first module mounting region and a second communication device 200_2 of the third module mounting region, a connection of a high-frequency signal is made by a second millimeter-wave signal transmission path 9_2.

In this embodiment, a signal serving as a target of communication in the millimeter-wave band is set only as a high-speed or large-volume signal, and others that are enough for a low speed/small volume or a signal regarded to be a direct current such as a power source are not set as a target of conversion into a millimeter-wave signal. For a signal (including a power source) that is not a target of conversion into a millimeter-wave signal, a signal connection is made using a technique as done previously. Electrical signals of an original transmission target before conversion into millimeter waves are collectively referred to as a baseband signal. Each signal generation unit, described later, is an example of a millimeter-wave signal generation unit or an electrical signal conversion unit.

In the first communication device 100, a semiconductor chip 103 and a transmission path coupling unit 108 corresponding to transmission/reception in the millimeter-wave band are installed on a substrate 102. The semiconductor chip 103 is a large scale integrated circuit (LSIC) into which a large scale integration (LSI) functional unit 104, which is an example of a front-stage signal processing unit, is integrated with a signal generation unit 107_1 for transmission processing, and a signal generation unit 207_1 for reception processing. Although not illustrated, the LSI functional unit 104, the signal generation unit 107_1, and the signal generation unit 207_1 may be separately configured, or any two may be configured to be integrated.

The semiconductor chip 103 is connected to the transmission path coupling unit 108. Incidentally, although it will be described later, the transmission path coupling unit 108 can be configured to be embedded in the semiconductor chip 103. A portion in which the transmission path coupling unit 108 and the millimeter-wave signal transmission path 9 are coupled together (that is, a portion that transmits a wireless signal) is a transmission position or a reception position, and an antenna typically corresponds thereto.

The LSI functional unit 104 manages primary application control of the first communication device 100, and, for example, includes a circuit for processing various signals to be transmitted to a counterpart, or a circuit for processing various signals received from a counterpart (the second communication device 200). The first communication device 100_1 and the first communication device 100_2 may share one LSI functional unit 104.

In the second communication device 200, the semiconductor chip 203 and a transmission path coupling unit 208 corresponding to transmission/reception in the millimeter-wave band are mounted on a substrate 202. The semiconductor chip 203 is connected to the transmission path coupling unit 208. Incidentally, although it will be described later, the transmission path coupling unit 208 can be configured to be embedded in the semiconductor chip 203. As the transmission path coupling unit 208, one similar to the transmission path coupling unit 108 is adopted. The semiconductor chip 203 is an LSI into which an LSI functional unit 204, which is an example of a rear-stage signal processing unit, is integrated with a signal generation unit 207_2 for reception processing and a signal generation unit 107_2 for reception processing. Although not illustrated, the LSI functional unit 204, the signal generation unit 1072, and the signal generation unit 2072 may be separately configured, or any two may be configured to be integrated.

The transmission path coupling units 108 and 208 electromagnetically couple a high-frequency signal (an electrical signal of the millimeter-wave band) to the millimeter-wave signal transmission path 9. For example, an antenna structure including an antenna coupling unit, an antenna terminal, an antenna, and the like is applied. Alternatively, the antenna structure may be a transmission line itself, such as a microstrip line, a strip line, a coplanar line, or a slot line.

The signal generation unit 107_1 has a transmission-side signal generation unit 110 for converting a signal from the LSI functional unit 104 into a millimeter-wave signal and performing signal transmission control via the millimeter-wave signal transmission path 9. The signal generation unit 207_1 has a reception-side signal generation unit 220 for performing signal reception control via the millimeter-wave signal transmission path 9. The signal generation unit 2072 has the transmission-side signal generation unit 110 for converting a signal from the LSI functional unit 204 into a millimeter-wave signal and performing signal transmission control via the millimeter-wave signal transmission path 9. The signal generation unit 207_2 has the reception-side signal generation unit 220 for performing signal reception control via the millimeter-wave signal transmission path 9. The transmission-side signal generation unit 110 and the transmission path coupling unit 108 constitute a transmission system (a transmission unit: a transmission-side communication unit). The reception-side signal generation unit 220 and the transmission path coupling unit 208 constitute a reception system (a reception unit: a reception-side communication unit).

In order to generate a millimeter-wave signal by performing signal processing on the input signal, the transmission-side signal generation unit 110 includes a multiplexing processing unit 113, a parallel-to-serial conversion unit 114, a modulation unit 115, a frequency conversion unit 116, and an amplification unit 117. The amplification unit 117 is an example of an amplitude adjustment unit that adjusts the magnitude of the input signal and outputs the input signal whose magnitude is adjusted. The modulation unit 115 and the frequency conversion unit 116 may be integrated as a so-called direct conversion type.

When there are a plurality of (N1) types of signals serving as a communication target in the millimeter-wave band within a signal from the LSI functional unit 104, the multiplexing processing unit 113 performs a multiplexing process such as TDM, FDM, or code division multiplexing to integrate the plurality of types of signals into a single-system signal. For example, the multiplexing processing unit 113 integrates a plurality of types of high-speed or large-volume signals as the target to be transmitted through millimeter waves into a single-system signal.

The parallel-to-serial conversion unit 114 converts parallel signals into a serial data signal, and supplies the serial signal to the modulation unit 115. The modulation unit 115 modulates a transmission target signal, and supplies the modulated signal to the frequency conversion unit 116. The parallel-to-serial conversion unit 114 is provided in the case of a parallel interface spec in which a plurality of signals for parallel transmission are used when this embodiment is not applied, and is unnecessary in the case of a serial interface spec.

It is only necessary for the modulation unit 115 to basically modulate at least one of the amplitude, frequency, or phase in a transmission target signal, and an arbitrary combination scheme thereof can also be adopted. Examples of an analog modulation scheme are amplitude modulation (AM) and vector modulation. Examples of vector modulation include frequency modulation (FM) and phase modulation (PM). Examples of a digital modulation scheme are amplitude shift keying (ASK), frequency shift keying (FSK), phase shift keying (PSK), and amplitude phase shift keying (APSK) in which the amplitude and phase are modulated. Quadrature Amplitude Modulation (QAM) is a representative example of amplitude/phase modulation. In this embodiment, in particular, a scheme is adopted in which a synchronous detection scheme can be adopted on the reception side.

The frequency conversion unit 116 generates a millimeter-wave electrical signal (a high-frequency signal) by converting the frequency of the transmission target signal modulated by the modulation unit 115, and supplies the millimeter-wave electrical signal to the amplification unit 117. The "millimeter-wave electrical signal" refers to an electrical signal of a certain frequency in a range of about 30 GHz to 300 GHz. It is only necessary for a frequency value described using the term "about" to be accurate to the extent that the effect of millimeter-wave communication is obtained, and the frequency is based on the fact that the lower limit is not limited to 30 GHz, and the upper limit is not limited to 300 GHz.

Although various circuit configurations can be adopted as the frequency conversion unit 116, for example, it is only necessary to adopt a configuration having a frequency mixing circuit (a mixer circuit) and a local oscillation circuit. The local oscillation circuit generates a carrier (a carrier signal or a reference carrier) for use in modulation. The frequency mixing circuit generates a transmission signal of a millimeter-wave band by multiplying (modulating) the carrier of a millimeter-wave band generated by the local oscillator circuit with a signal from the parallel-to-serial conversion unit 114, and supplies the transmission signal to the amplification unit 117.

The amplification unit 117 amplifies the millimeter-wave electrical signal after the frequency conversion, and supplies the amplified signal to the transmission path coupling unit 108. The amplification unit 117 is connected to the two-way transmission path coupling unit 108 via an antenna terminal (not illustrated). The transmission path coupling unit 108 transmits the millimeter-wave signal generated by the signal generation unit 110 on the transmission side to the millimeter-wave signal transmission path 9. The transmission path coupling unit 108, for example, includes an antenna coupling unit. The antenna coupling unit constitutes an example of the transmission path coupling unit 108 (signal coupling unit) or part thereof. The antenna coupling unit refers to a portion that couples an electronic circuit within a semiconductor chip to an antenna arranged inside or outside the chip in a narrow sense, and refers to a portion that performs signal coupling between the semiconductor chip and the millimeter-wave signal transmission path 9 in a broad sense. For example, the antenna coupling unit includes at least an antenna structure. The antenna structure refers to a structure in a unit electromagnetically coupled (by an electromagnetic field) to the millimeter-wave signal transmission path 9. It is only necessary for the antenna structure to couple an electrical signal of a millimeter-wave band (via a high-frequency signal waveguide 308 in this example) to the millimeter-wave signal transmission path 9, and the antenna structure does not refer to only an antenna itself.

In order to generate an output signal by performing signal processing on the millimeter-wave electrical signal received by the transmission path coupling unit 208, the reception-side signal generation unit 220 includes an amplification unit 224, a frequency conversion unit 225, a demodulation unit 226, a serial-to-parallel conversion unit 227, and a demultiplexing processing unit 228. The amplification unit 224 is an example of an amplitude adjustment unit that adjusts the magnitude of the input signal and outputs the input signal whose magnitude is adjusted. The frequency conversion unit 225 and the demodulation unit 226 may be integrated as a so-called direct conversion type. Also, a demodulated carrier signal may be generated by applying an injection lock method. The reception-side signal generation unit 220 is connected to the transmission path coupling unit 208. The reception-side amplification unit 224 is connected to the transmission path coupling unit 208 and amplifies a millimeter-wave electrical signal received by the antenna, and then supplies the amplified signal to the frequency conversion unit 225. The frequency conversion unit 225 converts the frequency of the amplified millimeter-wave electrical signal, and supplies the frequency-converted signal to the demodulation unit 226. The demodulation unit 226 demodulates the frequency-converted signal to acquire a baseband signal, and supplies the baseband signal to the serial-to-parallel conversion unit 227.

The serial-to-parallel conversion unit 227 converts the serial received data into parallel output data, and supplies the parallel output data to the demultiplexing processing unit 228. Like the parallel-to-serial conversion unit 114, the serial-to-parallel conversion unit 227 is provided in the case of a parallel interface spec in which a plurality of signals for parallel transmission are used when this embodiment is not applied. When the original signal transmission between the first communication device 100 and the second communication device 200 is in a serial form, the parallel-to-serial conversion unit 114 and the serial-to-parallel conversion unit 227 may not be provided.

When the original signal transmission between the first communication device 100 and the second communication device 200 is in a parallel form, the number of signals to be converted into millimeter waves is reduced by performing parallel-to-serial conversion on the input signal and transmitting a serial signal to the semiconductor chip 203, or by performing serial-to-parallel conversion on a received signal from the semiconductor chip 203.

The demultiplexing processing unit 228 corresponds to the multiplexing processing unit 113 and separates signals integrated into one system into a plurality of types of signals_n (n denotes 1 to N). For example, a plurality of data signals integrated into a signal of one system are separated, and the separated data signals are supplied to the LSI functional unit 204.

The LSI functional unit 204 manages primary application control of the second communication device 200, and, for example, includes a circuit for processing various signals received from a counterpart.

[Dealing with One-Way Communication]

Although the example illustrated in FIG. 2 is a configuration corresponding to two-way communication, a configuration including a pair of the signal generation unit 107_1 and the signal generation unit 207_1, or a pair of the signal generation unit 107_2 and the signal generation unit 2072, serves as a configuration corresponding to the one-way communication. Incidentally, the "two-way communication" illustrated in FIG. 2 serves as single-core, two-way communication transmission in which the millimeter-wave signal transmission path 9 that is a millimeter-wave transmission path is a single system (a single core). In order to implement the above, a half-duplex scheme to which TDM (TDD: Time Division Duplex) is applied, FDM (FDD: Frequency Division Duplex), or the like, is applied.

[Millimeter-Wave Signal Transmission Path]

The millimeter-wave signal transmission path 9, which is a millimeter-wave propagation path, for example, may be configured to propagate through a space within a housing as a free space transmission path. In this embodiment, preferably, the millimeter-wave signal transmission path 9 includes a waveguide, a transmission line, a dielectric line, or a waveguide structure within a dielectric or the like, and serves as the high-frequency signal waveguide 308 having a property of efficiently transmitting electromagnetic waves by configuring electromagnetic waves of a millimeter-wave band to be confined within the transmission path. For example, the millimeter-wave signal transmission path 9 may be configured as a dielectric transmission path 9A configured to contain a dielectric material having a relative dielectric constant within a given range and a dielectric loss tangent within a given range.

The dielectric transmission path 9A is configured by making a connection between the antenna of the transmission path coupling unit 108 and the antenna of the transmission path coupling unit 208 using a dielectric line which is a linear member having a line diameter formed of a dielectric material or an electric plate path which is a plate-like member having a certain thickness. For example, the dielectric transmission path 9A may be a circuit substrate itself or may be provided on the substrate or embedded in the substrate. Plastic can be used as a dielectric material, and the dielectric transmission path 9A can be cheaply configured. For the dielectric plate path, it is possible to adopt various forms such as a form created by one dielectric plate, a form in which a transmission path (a waveguide: this is substantially the same hereinafter) is arranged in a comb shape (for example, notches are formed in one dielectric plate), a form in which a transmission path is arranged in a lattice shape (for example, a plurality of openings are provided in one dielectric plate), and a form in which one transmission path is arranged in a spiral shape. Also, the transmission path may be embedded in another dielectric having a different dielectric constant or installed on another dielectric having a different dielectric constant. To avoid unintended movement, the transmission path to the housing or the like may be fixed using an adhesive, a metal, or another fixing material. Further, instead of the dielectric material, a magnetic material can be used.

The periphery (an upper surface, a lower surface, and a side surface: a portion corresponding to the transmission position or the reception position is excluded) of the dielectric transmission path 9A, excluding the region in which the module is installed, may be preferably surrounded with a shielding material (preferably, a metal member including metal plating is used) so that there is no influence of unnecessary electromagnetic waves from outside or no millimeter waves leak out from inside. Because the metal member functions as a reflecting material when used as the shielding material, a reflected component is used, so that reflected waves can be used for transmission and reception and sensitivity is improved. However, there may be a problem in that unnecessary standing waves occur within the millimeter-wave signal transmission path 9 due to multi-reflection within the millimeter-wave signal transmission path 9. In order to avoid this problem, the periphery (an upper surface, a lower surface, and a side surface) of the dielectric transmission path 9A, excluding the region in which the module is installed, may remain open, and an absorbing material (radio-wave absorbing body), which absorbs millimeter waves, may be arranged. Although it is difficult to use the reflected waves for transmission and reception when a radio-wave absorbing body is used, radio waves leaked from an end can be absorbed, so that leakage to outside can be prevented and a multi-reflection level within the millimeter-wave signal transmission path 9 can be decreased.

Further, these particulars are principal particulars related to the millimeter-wave signal transmission path 9 (high-frequency signal waveguide 308). In this embodiment, an arrangement form of the high-frequency signal waveguide 308 is formed to be a predetermined basic shape (details will be described later). At such points, a comb shape or a spiral shape is not adopted. In particular, in this embodiment, the arrangement form of the high-frequency signal waveguide (millimeter-wave signal transmission path 9) is assumed to be predetermined. Accordingly, the module mounting region in which the module can be mounted is predetermined so that its arrangement form is adopted. When the module is mounted in the module mounting region, a transmission path of a high-frequency signal is constructed in the high-frequency signal waveguide 308. Thereby, preferably, a communication network is configured.

[Connection and Operation]

A technique of performing signal transmission by converting a frequency of an input signal is typically used for broadcasting or wireless communication. In such applications, a relatively complex transmitter, receiver, or the like, which can cope with the problems of how far communication can be performed (a problem of a signal-to-noise (S/N) ratio against thermal noise), how to cope with reflection and multipath, how to suppress disturbance or interference with other paths, and the like, are used.

On the other hand, because the signal generation units 107 and 207 used in this embodiment are used in a millimeter-wave band, which is a higher frequency band than that used in a complex transmitter, receiver, or the like, typically used for broadcasting or wireless communication, and the wavelength $\lambda$ is short, units capable of easily reusing a frequency and suitable for communication among a number of adjacently arranged devices are used as the signal generation units 107 and 207.

In this embodiment, it is possible to flexibly cope with a high speed and a large volume by performing signal transmission in a millimeter-wave band as described above, unlike a signal interface using electrical wiring of the related art. For example, only high-speed or large-volume signals serve as a target of communication in a millimeter-wave band. Depending on the device configuration, the first communication device 100 and the second communication device 200 partly include an interface using electrical wiring (a connection by a terminal/connector) as done previously for low-speed/small-volume signals and power supply.

The signal generation unit 107 is an example of a signal processing unit that performs predetermined signal processing based on a set value (parameter). In this example, the signal generation unit 107 performs signal processing on an input signal input from the LSI functional unit 104 to generate a millimeter-wave signal. The signal generation units 107 and 207, for example, are connected to the transmission path coupling unit 108 via a transmission line such as a micro-strip line, a strip line, a coplanar line, or a slot line, and the generated millimeter-wave signal is supplied to the millimeter-wave signal transmission path 9 via the transmission path coupling unit 108.

The transmission path coupling unit 108, for example, has an antenna structure, and has a function of converting the transmitted millimeter-wave signal into electromagnetic waves and transmitting the electromagnetic waves. The transmission path coupling unit 108 is electromagnetically coupled to the millimeter-wave signal transmission path 9, and the electromagnetic wave converted by the transmission path coupling unit 108 is supplied to one end of the millimeter-wave signal transmission path 9. The other end of the millimeter-wave signal transmission path 9 is coupled to the transmission path coupling unit 208 on the side of the second communication device 200. By providing the millimeter-wave signal transmission path 9 between the transmission path coupling unit 108 on the side of the first communication device 100 and the transmission path coupling unit 208 on the side of the second communication device 200, electromagnetic waves of a millimeter-wave band propagate through the millimeter-wave signal transmission path 9. The transmission path coupling unit 208 receives electromagnetic waves transmitted to the other end of the millimeter-wave signal transmission path 9, converts the electromagnetic waves into a millimeter-wave signal, and then supplies the millimeter-wave signal to the signal generation unit 207 (baseband signal generation unit). The signal generation unit 207 is an example of a signal processing unit that performs predetermined signal processing on the basis of a set value (parameter). In this example, the signal generation unit 207 performs signal processing on the converted millimeter-wave signal to generate an output signal (baseband signal), and supplies the generated output signal to the LSI functional unit 204. Although the case of signal transmission from the first communication device 100 to the second communication device 200 has been described above, it is possible to transmit a millimeter-wave signal in two ways if the case of signal transmission from the LSI functional unit 204 of the second communication device 200 to the first communication device 100 is similarly considered.

[Communication Processing System: Relay]

Figure 3:
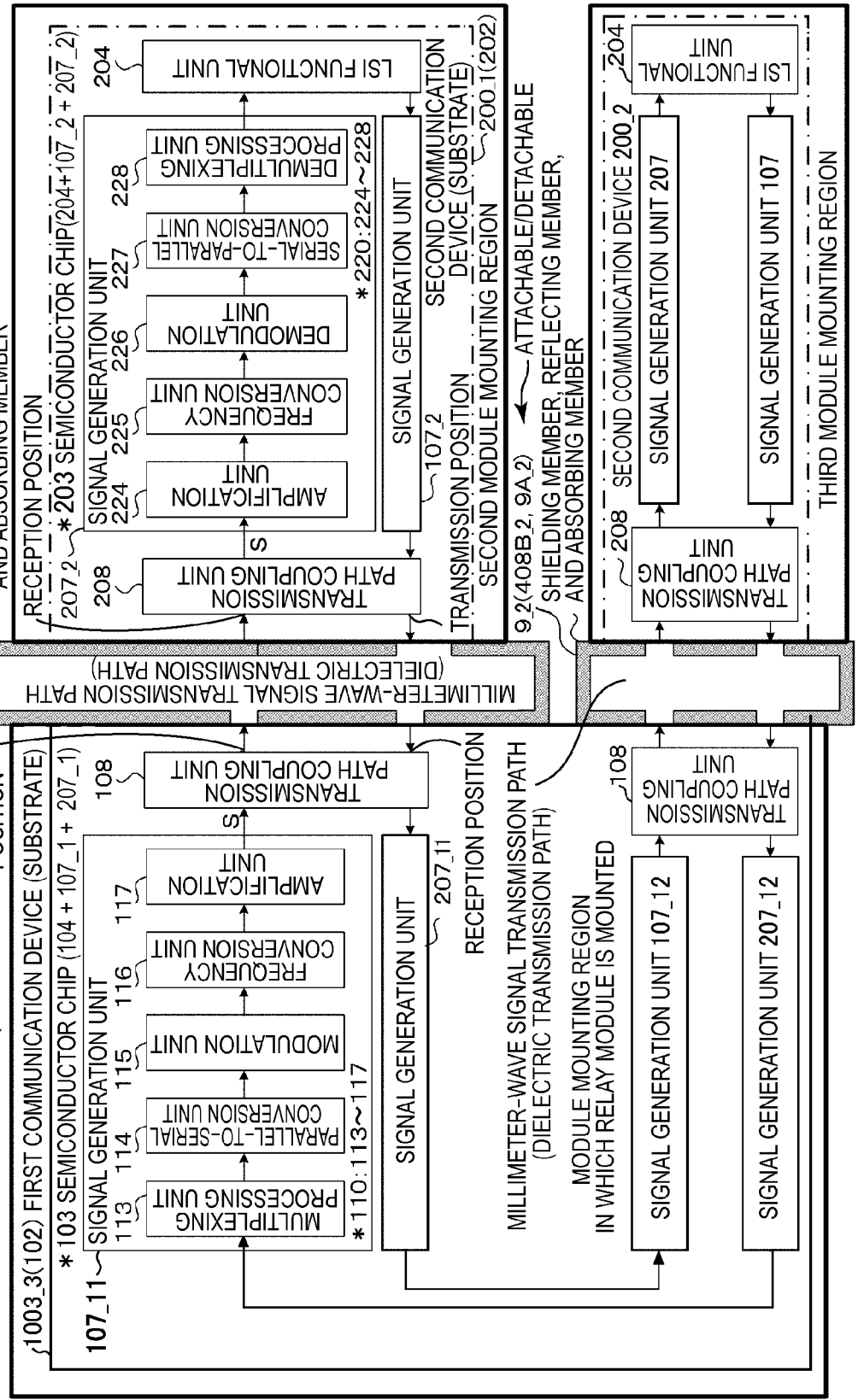
FIG. 3 is a functional block diagram focused on a communication process of a relay function in the waveguide device of this embodiment.

FIG. 3 is a diagram illustrating a signal interface of a relay function of this embodiment from the point of view of a functional configuration. In other words, FIG. 3 is a diagram when the relay function is primarily managed and is a functional block diagram focused on a communication process of the relay function in the waveguide device of this embodiment. The first communication device 100 and the second communication device 200 are formed to be attachable to and detachable from the module mounting region provided in a predetermined arrangement aspect on a main substrate. Here, in the module mounting region in which a relay module is mounted, a first communication device 100_3 constituting a function of a relay device is arranged. The first communication device 100_3 includes signal generation units 107_11, 207_11, 107_12, and 207_12, and is substantially a configuration obtained by combining first communication devices 100_1 and 100_2 of a basic configuration and removing the LSI functional unit 104. A signal obtained by the signal generation unit 207_12 performing a reception process on data from the third module mounting region is supplied to the signal generation unit 107_11. A signal obtained by the signal generation unit 207_11 performing a reception process on data from the second module mounting region is supplied to the signal generation unit 107_12. Thereby, the first communication device 100_3 transfers the data from the third module mounting region to the second module mounting region, or transfers the data from the second module mounting region to the third module mounting region. A so-called relay function (input/output function) is executed.

Comparative Examples

FIG. 4 is a diagram illustrating a signal interface of a signal transmission device of a comparative example from the point of view of a functional configuration. In FIG. 4(A), the overall outline is illustrated. A signal transmission device 1Z of the comparative example is configured so that a first device 100Z and a second device 200Z are coupled via an electrical interface 9Z and perform signal transmission. A semiconductor chip 103Z capable of signal transmission via electrical wiring is provided in the first device 100Z. Likewise, a semiconductor chip 203Z capable of signal transmission via electrical wiring is provided in the second device 200Z. A configuration in which the millimeter-wave signal transmission path 9 of the first embodiment is replaced with the electrical interface 9Z is made. Because signal transmission is performed via the electrical wiring, an electrical signal conversion unit 107Z is provided in the first device 100Z instead of the signal generation unit 107 and the transmission path coupling unit 108, and an electrical signal conversion unit 207Z is provided in the second device 200Z instead of the signal generation unit 207 and the transmission path coupling unit 208. In the first device 100Z, the electrical signal conversion unit 107Z performs electrical signal transmission control via the electrical interface 9Z for an LSI functional unit 104. On the other hand, in the second device 200Z, the electrical signal conversion unit 207Z is accessed via the electrical interface 9Z and obtains data transmitted from the side of the LSI functional unit 104.

For example, in an electronic device using a solid-state imaging device such as a digital camera, the solid-state imaging device is arranged in the vicinity of an optical lens, and various signal processing operations, such as image processing, compression processing, image storage, performed on an electrical signal from the solid-state imaging device are usually processed in a signal processing circuit outside the solid-state imaging device. For example, technology for transmitting an electrical signal at a high speed is necessary to cope with a large number of pixels and a high frame rate between the solid-state imaging device and the signal processing circuit. For this, low-voltage differential signaling (LVDS) is usually used. Although a matched impedance termination is necessary to accurately transmit an LVDS signal, it is necessary to equally maintain a mutual wiring length so that a wiring delay is sufficiently small to transmit a plurality of LVDS signals whose synchronization is necessary in a situation in which an increase in power consumption is also not ignorable. Although action such as increasing the number of LVDS signal lines is accomplished to transmit an electrical signal at a higher speed, difficulty in designing a printed wiring board increases, and complexity of a printed wiring board or cable wiring, and an increase in the number of terminals for wiring between the solid-state imaging device and the signal processing circuit, become problematic from the point of view of size reduction and low cost. Further, increasing the number of signal lines causes the following new problem. Increasing the number of lines increases the cost of a cable or a connector.

On the other hand, according to the present embodiment, the electrical signal conversion unit 107Z and the electrical signal conversion unit 207Z of the comparative example are replaced with the signal generation unit 107 and the signal generation unit 207, and the transmission path coupling unit 108 and the transmission path coupling unit 208, so that signal transmission is performed as a high-frequency signal (for example, a millimeter-wave band) instead of electrical wiring. A transmission path of a signal is changed from wiring to an electromagnetic transmission path. A connector or cable used in signal transmission by electrical wiring is not used, so that the effect of cost reduction is generated. It is not necessary to consider reliability related to a connector or cable, so that the effect of improving the reliability of a transmission path is generated. Although a space or an assembly time for engagement is necessary when a connector or cable is used, a high-frequency signal transmission is used, so that an assembly space is not used and a size of the device can be reduced. A production time can be reduced because the assembly time can be reduced.

In particular, in the present embodiment, the high-frequency signal waveguide capable of transmitting radio waves such as millimeter waves with low loss is provided within a cradle device, and a portable electronic device 420 having a transmission path coupling unit (coupler) is placed on the high-frequency signal waveguide, so that data transmission is performed by transmitting electromagnetic waves such as millimeter waves through an inside of the high-frequency signal waveguide. Compared to the connection of the electrical wiring, manufacturing efficiency is improved, because an error of several millimeters to several centimeters can be allowed without specifying a pin arrangement or a contact position as for a connector of electrical wiring in arrangements of the high-frequency signal waveguide and the transmission path coupling unit (so-called coupler). The transmission path coupling unit electromagnetically couples a high-frequency signal to the high-frequency signal waveguide, so that power of the transmitter is reduced, because it is possible to reduce loss of electromagnetic waves compared to a general wireless connection including wireless communication in an outdoor field. Because a configuration of a reception side can be simplified, power consumption of a communication function can be reduced, a size of the communication function can be reduced, and cost of the communication function can be reduced. Compared to the general wireless connection including the wireless communication in the outdoor field, the cost or size necessary to prevent interference can be reduced, because interference of radio waves from outside of the device and, conversely, radiation to the outside of the device, can be suppressed.

<Signal Processing Module>
[Rectangle]

FIG. 5 is a diagram (part 1) illustrating a configuration example of a signal processing module (corresponding to the first communication device 100 or the second communication device 200) having a communication function. Each diagram is a plan view.

The signal processing module illustrated in FIG. 5 is applied when the waveguide is arranged in a rectangle shape. For example, in a signal processing module 320A of a first example illustrated in FIG. 5(A), a semiconductor chip 323 (corresponding to the semiconductor chip 103 or 203) having a primary function as the signal processing module 320A is arranged on a base. On the same surface as that of the semiconductor chip 323 on the base, a high-frequency signal coupling structure 342 (corresponding to the transmission path coupling unit 108 or 208) having a transfer (coupling) function of a high-frequency signal (for example, millimeter waves) near the semiconductor chip 323 is provided. The semiconductor chip 323 may be connected to the high-frequency signal coupling structure 342 by a given method. The high-frequency signal coupling structure 342 is arranged on the edge of the rectangular high-frequency signal waveguide 332 (module housing). The entire signal processing module 320A is preferably, but not necessarily, molded by a resin or the like. Incidentally, even in the case of molding, preferably, a portion of the high-frequency signal coupling structure 342 may be exposed so that the high-frequency signal waveguide 308 comes in direct contact with the high-frequency signal coupling structure 342.

It is only necessary for the high-frequency signal coupling structure 342 to be electromagnetically coupled to the high-frequency signal waveguide 308. For example, although a transmission line such as a micro-strip line, a strip line, a coplanar line, or a slot line is adopted in addition to a dielectric material itself, the present disclosure is not limited thereto. Incidentally, when the dielectric material itself is used as the high-frequency signal coupling structure 342, the same material as in the high-frequency signal waveguide 308 is preferred. In the case of a different material, a material having the same dielectric constant is preferred.

If the high-frequency signal waveguide 308 is installed to be arranged facing the high-frequency signal coupling structure 342 with respect to the signal processing module 320A of this structure, it is possible to transmit a high-frequency signal from the semiconductor chip 323 to the high-frequency signal waveguide 308 via the high-frequency signal coupling structure 342. When the dielectric material itself is used without adopting a high-frequency transmission line such as a micro-strip line, or an antenna structure such as a patch antenna, as the high-frequency signal coupling structure 342, all of the high-frequency signal waveguide 308 and the high-frequency signal coupling structure 342 can be connected by the dielectric material. It is possible to establish millimeter-wave communication by a very simple configuration in which a transmission path of a high-frequency signal is configured by causing so-called plastics to be in contact with each other.

In a signal processing module 320B of a second example illustrated in FIG. 5(B), a high-frequency signal coupling structure (corresponding to the transmission path coupling unit 108 or the transmission path coupling unit 208) having a transfer (coupling) of the high-frequency signal (for example, an electrical signal of a millimeter-wave band) of the antenna structure or the like is configured within a semiconductor chip 324 (corresponding to the semiconductor chip 103 or 203) having a primary function as the signal processing module 320B. Substantially, the signal processing module 320B is constituted of the semiconductor chip 324 itself. The high-frequency signal coupling structure 346 is arranged on the edge of the rectangular semiconductor chip 324. Although a substantially planar antenna such as a patch antenna or an inverted-F antenna is preferably provided as the antenna structure of the high-frequency signal coupling structure 346, the present disclosure is not limited thereto. A Yagi antenna, a probe antenna (dipole, etc.), a loop antenna, a small aperture-coupled device (slot antenna, etc.), or the like, may be provided. The entire semiconductor chip 324 is preferably, but not necessarily, molded by a resin or the like. Incidentally, even in the case of molding, preferably, a surface side for electromagnetic coupling with the high-frequency signal waveguide 308 may be made to easily accomplish electromagnetic coupling with the high-frequency signal waveguide 308. If the high-frequency signal waveguide 308 is installed to be arranged facing the high-frequency signal coupling structure 346 with respect to the signal processing module 320B of this structure, it is possible to transmit a high-frequency signal from the semiconductor chip 324 to the high-frequency signal waveguide 308 via the high-frequency signal coupling structure 346.

In a signal processing module 320C of a third example illustrated in FIG. 5(C), the signal processing module 320B (substantially the semiconductor chip 324) of the second example illustrated in FIG. 5(B) is arranged on the base. The entire signal processing module 320C is preferably, but not necessarily, molded by a resin or the like. Incidentally, even in the case of molding, preferably, a portion of the high-frequency signal coupling structure 346 may be exposed. If the high-frequency signal waveguide 308 is installed to be arranged facing the high-frequency signal coupling structure 346 with respect to the signal processing module 320C of this structure, it is possible to transmit a high-frequency signal from the semiconductor chip 324 to the high-frequency signal waveguide 308 via the high-frequency signal coupling structure 346.

Further, in a signal processing module 320 in any of the first example illustrated in FIG. 5(A) to the third example illustrated in FIG. 5(C), high-frequency signal coupling structure 342, or 346 (collectively referred to as a coupler) are arranged on an edge of each member of the rectangle. However, this is an example. For example, the coupler may be arranged in the vicinity of a vertex of the rectangle. Also, the overall shape of the signal processing module 320 is not limited to the rectangle, and may be a circular shape.

[Triangle/Hexagon]

FIG. 6 is a diagram (part 2) illustrating the configuration example of the signal processing module (corresponding to the first communication device 100 or the second communication device 200) having the communication function. Each diagram is a plan view. For example, a signal processing module 320D of a fourth example illustrated in FIG. 6(A) is a module applied when the waveguide is arranged in a regular triangle shape. Further, although the case in which the signal processing module 320A of the first example is used as a basic element is shown here, the basic element may be any of the first to third examples. A planar shape of the signal processing module 320D is a regular hexagon. The high-frequency signal coupling structure 342 is arranged at the base (module housing) of the regular hexagon. Although not illustrated, the high-frequency signal coupling structure 342 may be arranged in the vicinity of the vertex of the base (module housing) of the regular hexagon.

A signal processing module 320E of a fifth example illustrated in FIG. 6(B) is a module applied when the waveguide is arranged in a regular hexagon shape. Further, although the case in which the signal processing module 320A of the first example is used as a basic element is shown here, the basic element may be any of the first to third examples. A planar shape of the signal processing module 320E is a regular triangle. The high-frequency signal coupling structure 342 is arranged in the vicinity of the vertex of the base (module housing) of the regular triangle. Although not illustrated, the high-frequency signal coupling structure 342 may be arranged at the vertex edge of the base (module housing) of the regular triangle.

In any of the first example illustrated in FIG. 5(A) to the fifth example illustrated in FIG. 6(B), the semiconductor chip 323 or 324 is arranged on the same side as that of the high-frequency signal waveguide 308. However, this is an example, and it may be arranged on the side opposite to the high-frequency signal waveguide 308. In any of the first example illustrated in FIG. 5(A) to the fifth example illustrated in FIG. 6(B), an electrical connection is made by an electrical wiring (including a flip chip and the like) as done previously for use of a signal (including the use for a power source) which is not a target of transmission in a high-frequency signal of a radio-wave frequency band, when necessary, although not illustrated.

Although an example in which the semiconductor chip 323 or 324 or the high-frequency signal coupling structure 342 or 346 is arranged on the base and mounted on the circuit substrate has been shown in the first example illustrated in FIG. 5(A) to the fifth example illustrated in FIG. 6(B), this is not only the case. The semiconductor chip or the high-frequency signal coupling structure may be directly installed on a circuit substrate without involving the base.

[Method of Fixing High-Frequency Signal Waveguide]

FIG. 7 is a diagram illustrating an example of the method of fixing the high-frequency signal waveguide 308. There are various methods for attaching and fixing the high-frequency signal waveguide 308 to the signal processing module 320. For example, the high-frequency signal waveguide 308 may be fixed by an adhesive or other fixing materials. However, in this case, removal is difficult at the time of module replacement or the like. Accordingly, it is desirable to adopt a configuration in which the high-frequency signal waveguide 308 can be easily removed at the time of module replacement or the like. For example, FIG. 7(A) illustrates an example in which the module fixing wall 540 is used. For example, the module fixing wall 540 comes in contact with any position of the signal processing module 320, thereby prescribing a relative position with the signal processing module 320. Accordingly, a position of the module fixing wall 540 is fixed by the substrate, and further the high-frequency signal waveguide 308 is inserted into and fixed in the module fixing wall 540. Incidentally, although a cross-sectional shape of the module fixing wall 540 is an L shape, it is not limited thereto. The module fixing wall 540 may be fixed to the substrate by a screw or another attaching member (fixing member). Permittivity or permeability of the module fixing wall 540 is set to be less than that of the high-frequency signal waveguide 308. Further, when the entire waveguide device 10 is configured by combining high-frequency signal waveguides 308, an element having the same characteristics may be used as the high-frequency signal waveguide 308, the module fixing wall 540, or the like.

Here, it is possible to cope with change in the coupler position of the signal processing module 320 (whether it is the edge of the rectangle or the vertex) by changing an attachment state, as illustrated in FIGS. 7(A) and 7(A). That is, when the coupler is arranged at the vertex of the rectangle of the signal processing module 320, it is only necessary to attach the signal processing module 320 so that the edge of the signal processing module 320 corresponds to a portion of the module fixing wall 540 as illustrated in FIG. 7(A). When the coupler is arranged at the edge of the rectangle of the signal processing module 320, it is only necessary to attach the signal processing module 320 so that the vertex of the signal processing module 320 corresponds to a portion of an L-shaped corner of the module fixing wall 540 and the side corresponds an L-shaped side as illustrated in FIG. 7(B). When the size (for example, width) of the high-frequency signal waveguide 308 is changed, it is only necessary to change a width 540W of an L-shaped portion according to the changed size.

[Directivity of High-Frequency Signal Coupling Structure]

FIG. 8 is views for explaining relations between the directivity of the high-frequency signal coupling structure, the degree of electromagnetic coupling between the high-frequency signal coupling structure and the high-frequency signal waveguide, and transmission direction of the high-frequency signal. Even in the first example illustrated in FIG. 5(A) to the sixth example illustrated in FIG. 6(B), the directivity of the high-frequency signal coupling structure may be either a horizontal direction (a longitudinal direction of the high-frequency signal waveguide 308) or a vertical direction (a thickness direction of the high-frequency signal waveguide 308). For example, FIG. 8(A) illustrates a case where the directivity is the horizontal direction. In this case, a dipole antenna or a Yagi antenna is arranged on the plate-like high-frequency signal waveguide 332. The directivity of the antenna is in the longitudinal direction of the high-frequency signal waveguide 332, and a radiated high-frequency signal is coupled to the high-frequency signal waveguide 308 in the horizontal direction and transmitted within the high-frequency signal waveguide 308. Power of a high-frequency signal transmitted within the high-frequency signal waveguide 308 in the horizontal direction is strong in a traveling direction and weakens according to separation from the traveling direction. Accordingly, by arranging the high-frequency signal coupling structure 342 and the like in association with the direction in which the high-frequency signal waveguide 308 is arranged, it is possible to transmit a high-frequency signal toward a desired signal processing module 320. Although a degree of electromagnetic coupling with the high-frequency signal waveguide 308 is inferior compared to the directivity of the vertical direction, the efficiency of transmitting a high-frequency signal within the high-frequency signal waveguide 308 in the horizontal direction is superior.

On the other hand, coupling of longitudinal waves using an antenna having vertical directivity is preferred in that electromagnetic coupling of a high-frequency signal between the signal processing module 320 and the high-frequency signal waveguide 308 is accomplished. FIG. 8(B) illustrates a case where the directivity is the vertical direction. In this case, as the high-frequency signal coupling structure 342 and the like, for example, a patch antenna is arranged on the plate-like high-frequency signal waveguide 332 (see FIG. 5). The directivity of the patch antenna is the vertical direction of the high-frequency signal waveguide 308, and a radiated high-frequency signal is coupled to the high-frequency signal waveguide 308 in the vertical direction (thickness direction) and transmitted within the high-frequency signal waveguide 308 by changing the direction to the horizontal direction. Although a degree of electromagnetic coupling to the high-frequency signal waveguide 308 is superior compared to the directivity of the horizontal direction, the efficiency of transmitting a high-frequency signal within the high-frequency signal waveguide 308 in the horizontal direction is inferior.

<Coping with Communication Network>

FIG. 9 is a diagram illustrating a technique of coping with the communication network. Here, the first example illustrated in FIG. 9(A) is a form in which there is a disadvantage in a state in which the communication network is configured. As illustrated in FIG. 9(A1), an end surface or a side surface of each high-frequency signal waveguide 308 comes in contact in the module mounting region (attachment/detachment unit) of the lattice point. Therefore, as illustrated in FIG. 9(A2), a loop of a transmission path is formed. A high-frequency signal emitted from the signal processing module 320 arranged in each module mounting region is transmitted to the signal processing model 320 of every position. In this case, while there is an advantage in that data can be transmitted to the signal processing module 320 of a separate position, it is not necessarily preferred that a so-called communication network be configured.

On the other hand, the second example illustrated in FIG. 9(B) is an advantageous form in a state in which the communication network is configured. Here, as illustrated in FIG. 9(B1), an end surface or a side surface of each high-frequency signal waveguide 308 does not come in contact in the module mounting region of the lattice point. That is, the transmission path is decoupled in the module mounting region. Therefore, as illustrated in FIG. 9(A2), the transmission path does not form a loop. The high-frequency signal emitted from the signal processing module 320 arranged in each module mounting region only reaches an adjacent module mounting region. In this portion, a high-frequency signal of each path can be distinguished when received by the high-frequency signal coupling structure 342 of the signal processing module 320 or the like. In this case, although it is difficult to directly transmit data to the signal processing module 320 of a separate position, there is an advantage in that a so-called communication network is configured. It is only necessary to relay data so as to transmit data to the signal processing module 320 of a separate position. The signal processing module 320 itself may be responsible for a data relay function. It is only necessary to arrange the relay module 328 for the data relay function at a position at which no signal processing module 320 is arranged.

<Coping with Multilane>

When a change is made so that a plurality of high-frequency signal waveguides 308 are arranged between waveguide fixing walls 520 of one pair (referred to as a multilane structure) in the course of configuring the waveguide device of this embodiment, it is only necessary to change the shape or size of the module fixing wall according to the number of high-frequency signal waveguides 308 (referred to as a lane count) after the change. Further, the same base 510 as shown in the first example of coping with the change in the waveguide size is used. Further, when the high-frequency signal waveguides 308 are formed in the multilane structure, there is a technique of performing arrangement in a planar shape (horizontally), a technique of performing arrangement vertically (performing vertical lamination), or a technique that is a combination of these techniques.

[Parallel Arrangement]

FIG. 10 is a diagram illustrating a first example of coping with multilane. The first example is a horizontal arrangement technique of arranging members constituting the high-frequency signal waveguide 308 in a planar shape (horizontally) (parallel arrangement). When the multilane structure is formed by the horizontal arrangement technique, this is associated with a change in a width of the entire high-frequency signal waveguide 308. In this case, it is only necessary to apply a technique of coping with a change in a width of the high-frequency signal waveguide described above. Here, the horizontal arrangement technique of arranging the high-frequency signal waveguides 308 in the planar shape (horizontally) will be described.

The high-frequency signal waveguides 308 of the first example illustrated in FIG. 10(A) are arranged in descending order of permittivity or permeability. The drawing illustrates the case in which three lanes are provided. On its boundary, a waveguide wall 580 formed by a member having lower permittivity or permeability than both sides is sandwiched. From the signal processing module 320, a high-frequency signal is electromagnetically coupled by an individual high-frequency signal coupling structure 342 or the like. In this case, the signal processing module 320 may be commonly or individually provided. In any high-frequency signal waveguide 308, its dielectric material or magnetic material has greater permittivity or permeability than that of the waveguide wall 580 constituting the boundary, so that a high-frequency signal incident on the high-frequency signal waveguide 308 travels in a propagation direction while reflection is iterated every time the high-frequency signal reaches a boundary surface. Because of this, it is possible to confine and transmit a high-frequency signal within each high-frequency signal waveguide 308.

For example, when electromagnetic waves (a high-frequency signal) are incident at a boundary between two media having different permittivities, refraction similar to optical refraction occurs. When electromagnetic waves are incident at a proper angle inside a dielectric plate, reflection is iterated on two boundaries and electromagnetic waves efficiently propagate without loss. Also, when electromagnetic waves (a high-frequency signal) are incident at a boundary between two media having different permeabilities, refraction similar to optical refraction occurs. When electromagnetic waves are incident at a proper angle inside a magnetic plate, reflection is iterated on two boundaries and the electromagnetic waves efficiently propagate without loss.

In terms of the high-frequency signal waveguide 308 of the second example illustrated in FIG. 10(B), high-frequency signal waveguides 308 (three high-frequency signal waveguides in the drawing) are arranged. A waveguide wall 582 (preferably, a metal wall) configured by a shielding member (typically, a metal material) having a shielding effect is sandwiched at a boundary. Thereby, regardless of whether permittivity or permeability is the same or different, it is possible to confine and transmit a high-frequency signal within each high-frequency signal waveguide 308. Although there may be an influence of a frequency or a transmission mode because so-called total reflection is used in FIG. 10(A), the influence is absent in FIG. 10(B).

[Lamination]

FIG. 11 is a diagram illustrating a second example of coping with multilane. The second example is a vertical lamination technique of arranging (laminating) members constituting the high-frequency signal waveguide 308. When the multilane structure is constructed by the vertical lamination technique, this is associated with a change in the entire height of the high-frequency signal waveguide 308. In this case, it is only necessary to apply a technique of coping with a change in the height of the high-frequency signal waveguide described above. Here, the vertical lamination technique of arranging the high-frequency signal waveguides 308 in the vertical direction will be described.

The high-frequency signal waveguides 308 of the first example illustrated in FIG. 11(A) are arranged in descending order of permittivity or permeability from the side of a coupler (the high-frequency signal coupling structure 342 or the like). On its boundary, a waveguide wall 586 formed by a member having higher permittivity or permeability than both sides is sandwiched. The coupler (the high-frequency signal coupling structure 342 or the like) of the signal processing module 320 is arranged on a side having highest permittivity or permeability.

In the high-frequency signal waveguide 308 of the second example illustrated in FIG. 10(B), a member (typically, a metal material) having a shielding effect is sandwiched at a lane boundary. Thereby, regardless of whether permittivity or permeability is the same or different, it is possible to confine and transmit a high-frequency signal within each high-frequency signal waveguide 308.

Even in the first example and the second example, a difference in a frequency characteristic by a thickness, width, and permittivity or permeability of a member constituting each lane (the waveguide layer: the high-frequency signal waveguide 308) is generated. For example, because there are three lanes in the illustrated example, three carrier components are used and a frequency to be transmitted to a main element by each layer is set to be different. For example, when plastic waveguides having different thicknesses and widths are used in the transmission of two frequencies and one lane, a difference in transmission loss or a data rate (transmission band) between the two frequencies can be recognized. Accordingly, while a carrier is set to reach a layer (a lowest layer in the drawing) of an end opposite to the coupler according to a difference in permittivity or permeability, a frequency to be primarily transmitted varies with every layer due to a difference in compatibility of a frequency and dimensions (a thickness and a width). Although full separation is not formed, it is a preferred configuration for good simultaneous transmission of a plurality of carriers. Incidentally, because it is necessary for the dimensions of each lane to be suitable for a shortened wavelength (electromagnetic waves propagating through a dielectric or magnetic permeation body have a shorter wavelength than when propagating through a vacuum), dimensions of a low-frequency waveguide increase. Accordingly, the low frequency is suitable for a layer close to the coupler and the high frequency is suitable for a distant layer.

When parallel arrangement (horizontal arrangement) and lamination (vertical lamination) are compared, for example, when dimensions in which a mode stands in a horizontal direction in a rectangular line and does not stand in a vertical direction have been formed, it is difficult to form a combination for coupling to a plurality of layers as in the example of vertical lamination in the horizontal arrangement. Accordingly, the vertical lamination corresponds to a single lane of a plurality of layers of a single coupler, and the horizontal arrangement corresponds to a plurality of lanes of a single layer of a plurality of couplers.

Even in the parallel arrangement and lamination, the second example of sandwiching in the metal wall is superior in that unnecessary leakage is rare, but a degree of freedom of modification is significantly low. On the other hand, the first example of sandwiching in the dielectric wall or the magnetic wall is superior in terms of the degree of freedom of modification, but is inferior in terms of unnecessary leakage. Incidentally, in the first example, it is important to put a difference on dimensions of a multilayer structure and a dielectric waveguide or a magnetic waveguide.

Specific Application Example

Next, a specific application example of a waveguide device 10 will be described.

Embodiment 1

Figure 12:
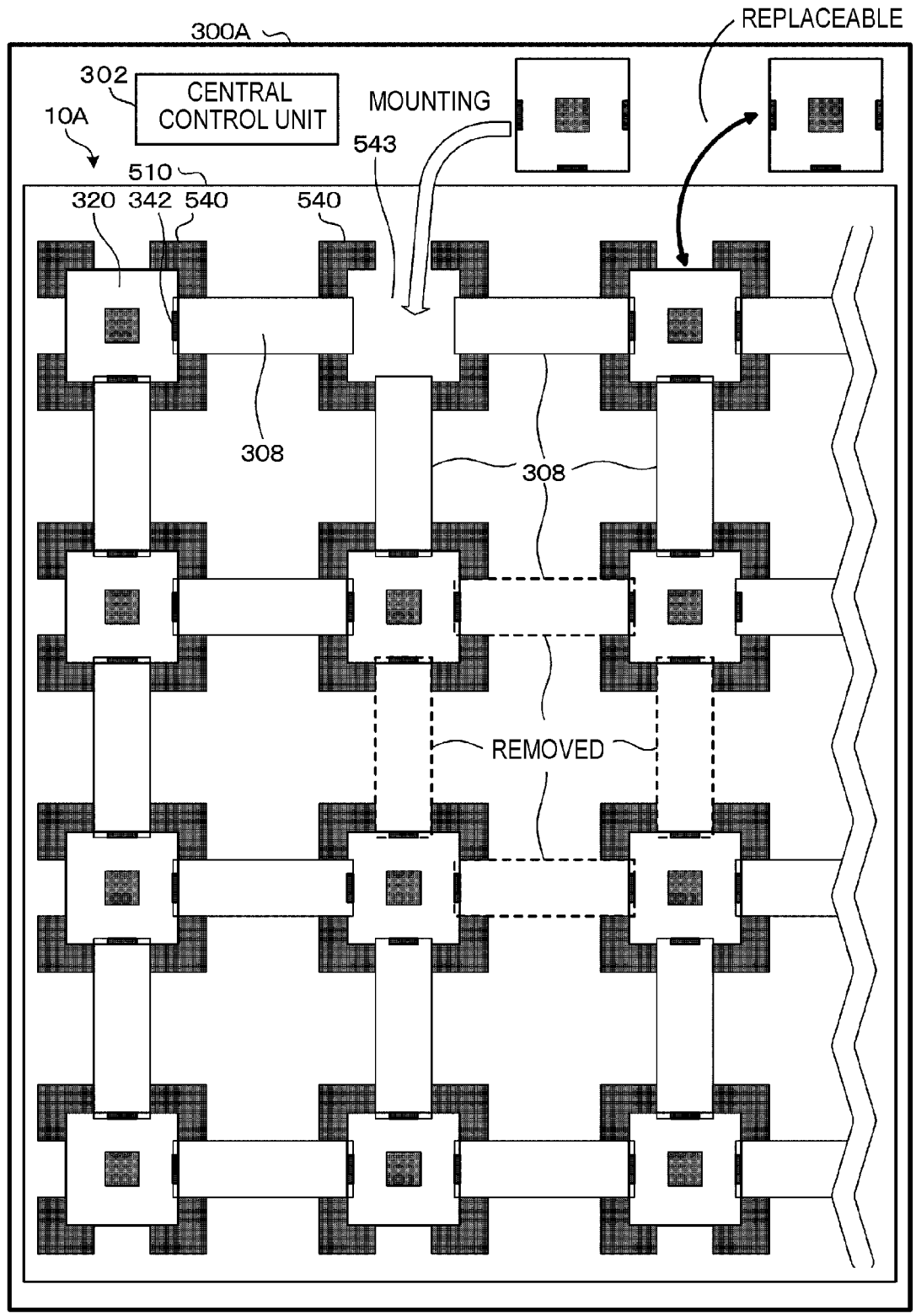
FIG. 12 is a plan view illustrating an overall outline of an electronic device of an embodiment 1 to which a signal transmission device of this embodiment is applied.

FIG. 12 is a plan view illustrating an overall outline of an electronic device of an embodiment 1 to which a signal transmission device of this embodiment is applied.

A waveguide device 10A of the embodiment 1 has a form in which a mounting unit (module mounting region 543) is provided at a position of its lattice point so that a waveguide can be arranged in a rectangle shape (a regular square shape), and a signal processing module 320 having the communication function is arranged. Each signal processing module is electromagnetically coupled to a high-frequency signal waveguide 308 (high-frequency signal transmission path) having a function of relaying (coupling) a high-frequency signal between signal processing modules. "Electromagnetic coupling" is "electromagnetically connecting (coupling)" and means that a high-frequency signal is connected to be transmitted within each connected high-frequency signal waveguide.

An electronic device 300A includes the waveguide device 10A and a central control unit 302 which controls the overall operation of the device. In the waveguide device 10A, the high-frequency signal waveguide 308 is arranged in the rectangle, a module mounting region 543 is provided at its intersection position, and a signal processing module 320 can be arranged. In FIG. 12, the signal processing module 320 is mounted at all positions. The mounted signal processing module is referred to as an existing signal processing module. The existing signal processing module may be responsible for a function of the central control unit 302. That is, the waveguide device 10 may be configured to include the central control unit 302. At this time, a plurality of existing signal processing modules as well as any one existing signal processing module 304 may be responsible therefor. Each existing signal processing module performs predetermined signal processing by itself, and performs signal processing while data is exchanged between the existing signal processing modules when a plurality of existing signal processing modules are mounted.

The central control unit 302 changes configuration information based on a signal processing module coupled to the high-frequency signal waveguide 308, and controls data transmission according to the changed configuration information. For example, if it is recognized that a combination configuration of signal processing modules having a communication function has been changed, data transmission is controlled to be performed between signal processing modules suitable for a changed module combination or central processing units (CPUs) (which may be central control units 302). It is only necessary to use normal electrical wiring (a printed pattern, wire hardness, or the like) for a signal for control or module recognition. For example, the central control unit 302 includes an arrangement sensing unit that senses that a signal processing module 320 for a configuration change (configuration change signal processing module) is arranged on the high-frequency signal waveguide 308, and a communication control unit which controls the existing signal processing module or the configuration change signal processing module, and controls communication between signal processing modules according to a configuration change when the arrangement sensing unit has sensed that the signal processing module 320 for the configuration change has been arranged. The arrangement sensing unit may include a recognition function of recognizing an arrangement position or what (which function) has been arranged, as well as a function of sensing whether the signal processing module has been arranged in the high-frequency signal waveguide 308. As the function of recognizing "what has been arranged," a function of identifying a foreign object (in other words, a function of sensing whether there is a signal processing module having the communication function), as well as a function of identifying a signal processing module having the communication function, may also be included. In order to implement a function of recognizing "what has been arranged," reflected waves of a signal transmitted from the existing module or a signal from a newly arranged module may be used. For example, if there is anything arranged on the attachment/detachment unit, reflected waves of a signal transmitted from the existing module are changed and what has been arranged can be recognized. Further, when what has been arranged is a signal processing module having the communication function, a signal for identifying the signal processing module or the like is transmitted. Based on the signal, the central control unit 302 (arrangement sensing unit) can recognize "what has been arranged." When there is no reaction (no signal) from an arranged object (device), it is only necessary to determine the arranged object as a foreign object.

When signal processing is performed between existing signal processing modules, a communication process is performed via the high-frequency signal waveguide 308 by performing conversion into a high-frequency signal of a millimeter-wave band or a frequency band before or after the millimeter-wave band (for example, a sub-millimeter-wave band or a centimeter-wave band) (hereinafter representatively referred to as a millimeter-wave band) in terms of high-speed or large-volume data. It is only necessary to transmit other data (including a power source) through normal electrical wiring (including pattern wiring). A communication device, which implements a millimeter-wave transmission function, is provided in the existing signal processing module so as to perform a communication process in a millimeter-wave band via the high-frequency signal waveguide 308 between existing signal processing modules, and a high-frequency signal coupling structure provided in the communication device and the high-frequency signal waveguide 308 are arranged to be able to be electromagnetically coupled. For example, each existing signal processing module is mounted to be in contact with the high-frequency signal waveguide, so that communication of millimeter waves transmitted through the high-frequency signal waveguide 308 is established. Further, using so-called FDM with a plurality of carrier frequencies which are different frequencies, communication of a plurality of systems in one frequency signal transmission path 308 is possible.

Here, in the waveguide device 10A, a configuration change signal processing module is added to a region (that is, a region that can be electromagnetically coupled to the module: the module mounting region 543) in which the configuration change signal processing module (in other words, a communication device) capable of performing a communication process in a millimeter-wave band when a function change is made can be mounted. The module mounting region 543 is a position at which the high-frequency signal waveguide 308 intersects, and is a position of a vertex of a basic shape (a regular square in this example) of an arrangement aspect of the high-frequency signal waveguide 308. Even after the configuration change by adding or replacing the configuration change signal processing module later, high-speed/large-volume millimeter-wave communication is established via the high-frequency signal waveguide 308. Thereby, high-speed data transmission using millimeter waves is performed with low loss.

The waveguide device 10A is provided in the electronic device 300A, and a position at which the signal processing module 320 can be arranged is set as the module mount region 543 so that the high-frequency signal waveguide 308 can be arranged in a predetermined arrangement aspect. When the signal processing module 320 has been additionally mounted in the module mounting region 543, electromagnetic coupling between each coupler of an existing signal processing module having a millimeter-wave transmission function and the configuration change signal processing module and the high-frequency signal waveguide 308 is accomplished. Thereby, the millimeter-wave communication transmitted through the high-frequency signal waveguide 308 between the existing signal processing module and the configuration change signal processing module is established and high-speed data transmission can be performed by reducing multipath, transmission degradation, or unnecessary radiation. When a configuration change such as a function change is necessary, it is possible to establish millimeter-wave communication transmitted through the high-frequency signal waveguide 308 by arranging the configuration change signal processing module in the module mounting region 543. The high-frequency signal waveguide 308 is attachable and detachable, and is removed as for an unnecessary connection relationship (see a position indicated by the dashed line of the drawing). Thus, it is possible to easily implement intra-device communication regardless of burdens, such as design change, increase in a substrate area, and increase in cost, associated with a configuration change such as a functional extension.

Also, when the high-frequency signal waveguide 308 is decoupled in a portion of the module mounting region 543, a communication network can be constructed. A transmission network including the high-frequency signal waveguide 308 and the signal processing module 320 having the communication function is implemented. Large-volume communication is possible and power-saving long-distance transmission is possible with low loss. There is also an advantage in that cheap plastic is available in the high-frequency signal waveguide 308. Connection media of the high-frequency signal between each signal processing module 320 have a uniform length, so that transmission characteristics can be made the same, and setting management such as transmission power is easy.

Further, in the configuration of the embodiment 1, a communication network (transmission network) includes the high-frequency signal waveguide 308 of a single length created in a lattice shape and the signal processing module 320. In particular, only data is merely mutually exchanged without designating a central module, and it is difficult to perform data transmission over an adjacent module mounting region 543. However, the signal processing module 320 has a relay function, thereby causing data to be transmitted over the module mounting region 543, as in the embodiment 2 described later.

Embodiment 2

Figure 13:
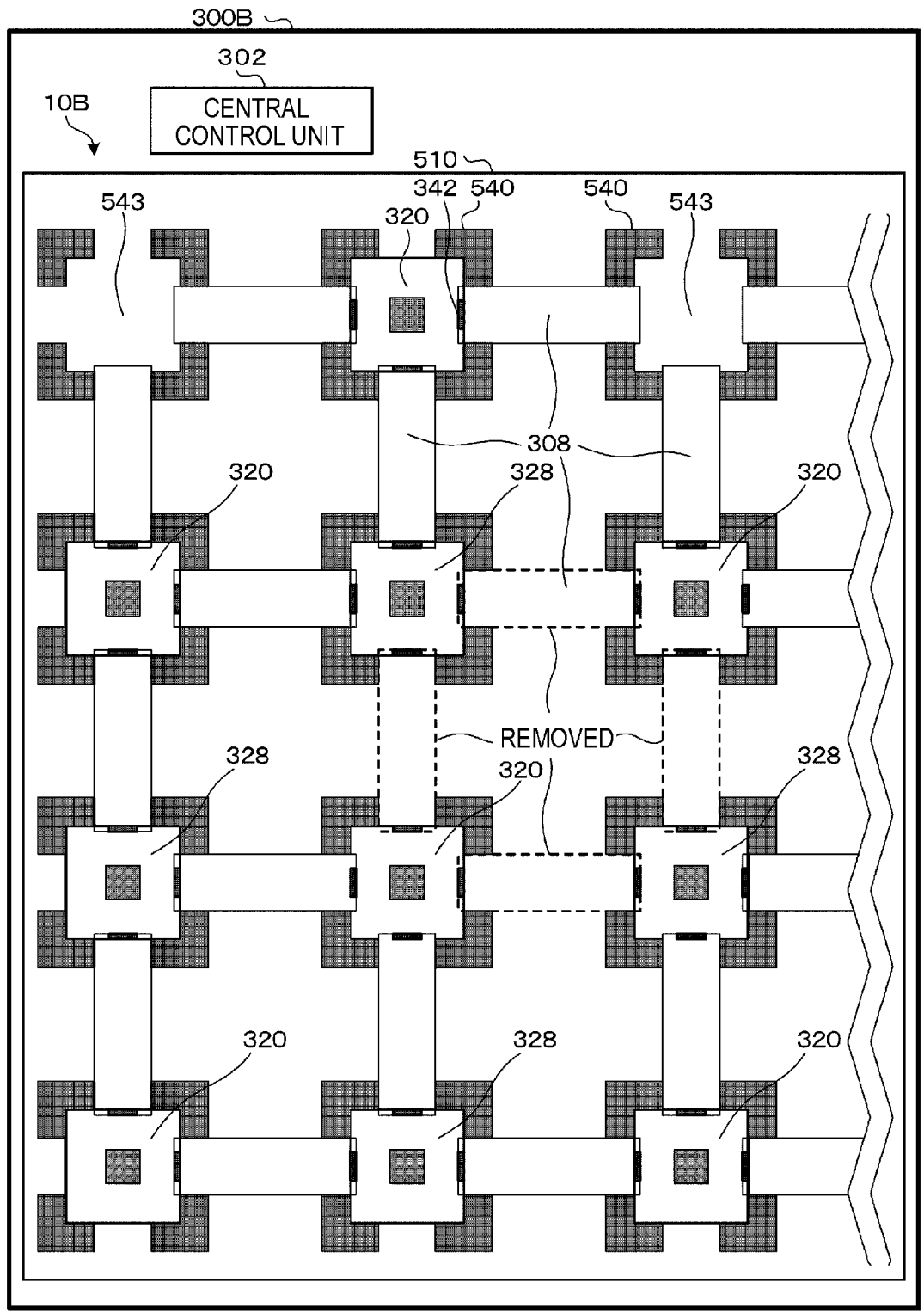
FIG. 13 is a plan view illustrating an overall outline of an electronic device of an embodiment 2 to which a signal transmission device of this embodiment is applied.

FIG. 13 is a plan view illustrating an overall outline of an electronic device of the embodiment 2 to which a signal transmission device of this embodiment is applied. In the embodiment 2, the high-frequency signal waveguide 308 is also attachable and detachable, and is removed as for an unnecessary connection relationship (see a position indicated by the dashed line of the drawing).

As illustrated in FIG. 13, the waveguide 10B of the embodiment 2 has an aspect in which a normal signal processing module 320 and a relay module 328 (a signal processing module having a relay function (input/output processing function)) are alternately arranged in a module mounting region 543 of a lattice point of a waveguide arranged in a rectangle (regular square shape), based on the waveguide device 10A of the embodiment 1. Although the embodiment 2 is similar to the embodiment 1 in that a waveguide of a single length created in a lattice shape and a module having the communication function form a transmission network, the embodiment 2 is different from the embodiment 1 in that a center to manage another module is determined (wherein the relay module 328 is responsible for the determination), and data is exchanged after a role of a module has been mutually recognized. For example, as illustrated in FIG. 13A, a signal processing module 320_1 is a module responsible for sound processing, a signal processing module 320_2 is a module responsible for still-image processing, and a signal processing module 320_3 is a module for moving-image processing. The relay module 328 may perform integrated signal processing by aggregating data from the signal processing module 320_1 (sound processing), the signal processing module 320_2 (still-image processing), and the signal processing module 320_3 (moving-image processing), and may further exchange data with the signal processing module 320 of an adjacent module mounting region 543 (not illustrated).

Embodiment 3

Figure 14:
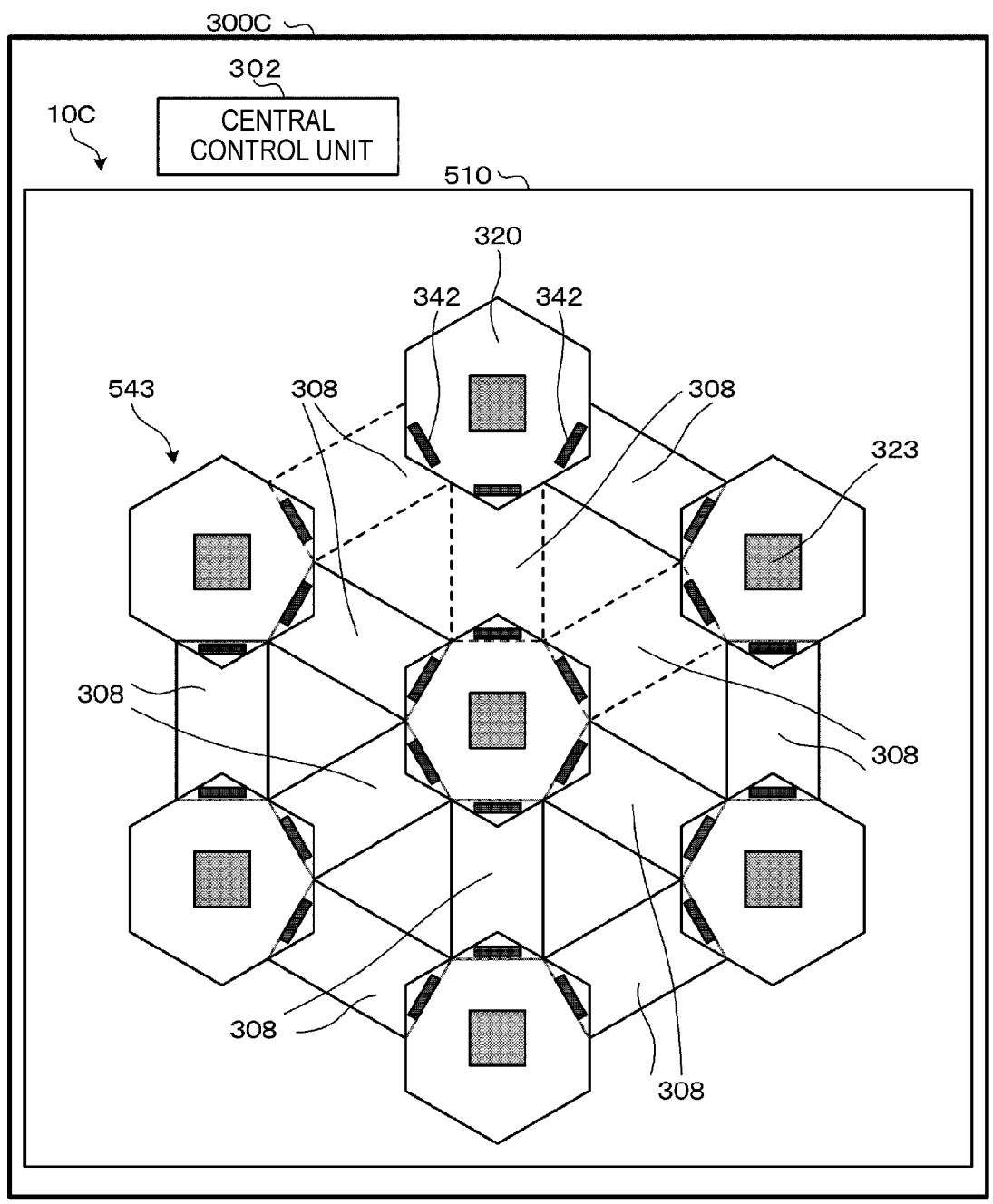
FIG. 14 is a diagram illustrating a waveguide device of an embodiment 3 to which a signal transmission device of this embodiment is applied.

FIG. 14 is a diagram illustrating a waveguide device of the embodiment 3 to which a signal transmission device of this embodiment is applied, and is a plan view illustrating an overall outline of the electronic device. An electronic device 300C of the embodiment 3 has an aspect in which a basic shape of arrangement of a waveguide is a regular triangle. Also in the embodiment 3, the high-frequency signal waveguide 308 is attachable and detachable, and is removed as for an unnecessary connection relationship (see a position indicated by the dashed line of the drawing).

As in the embodiment 1, the electronic device 300C includes a waveguide device 10C and the central control unit 302 which controls an overall operation of the device. In the waveguide device 10C of the embodiment 3, the signal processing module 320 of a regular hexagon (honeycomb shape) is arranged in the module mounting region 543 arranged at a vertex of a regular triangle. This arrangement has an aspect in which the signal processing module 320 can be most densely arranged. Although there is a difference of whether a basic shape of waveguide arrangement is a regular square or a triangle, it is possible to have effects similar to those of the above-described embodiment 1 or 2. Further, when a set of six triangles of the same vertex is focused on, an aspect in which the basic shape of waveguide arrangement is a regular hexagon is extracted. If the waveguide and the signal processing module 320 are not used in the central direction thereof, it is only necessary to arrange the signal processing module 320 in a regular triangle.

Embodiment 4

Figure 15:
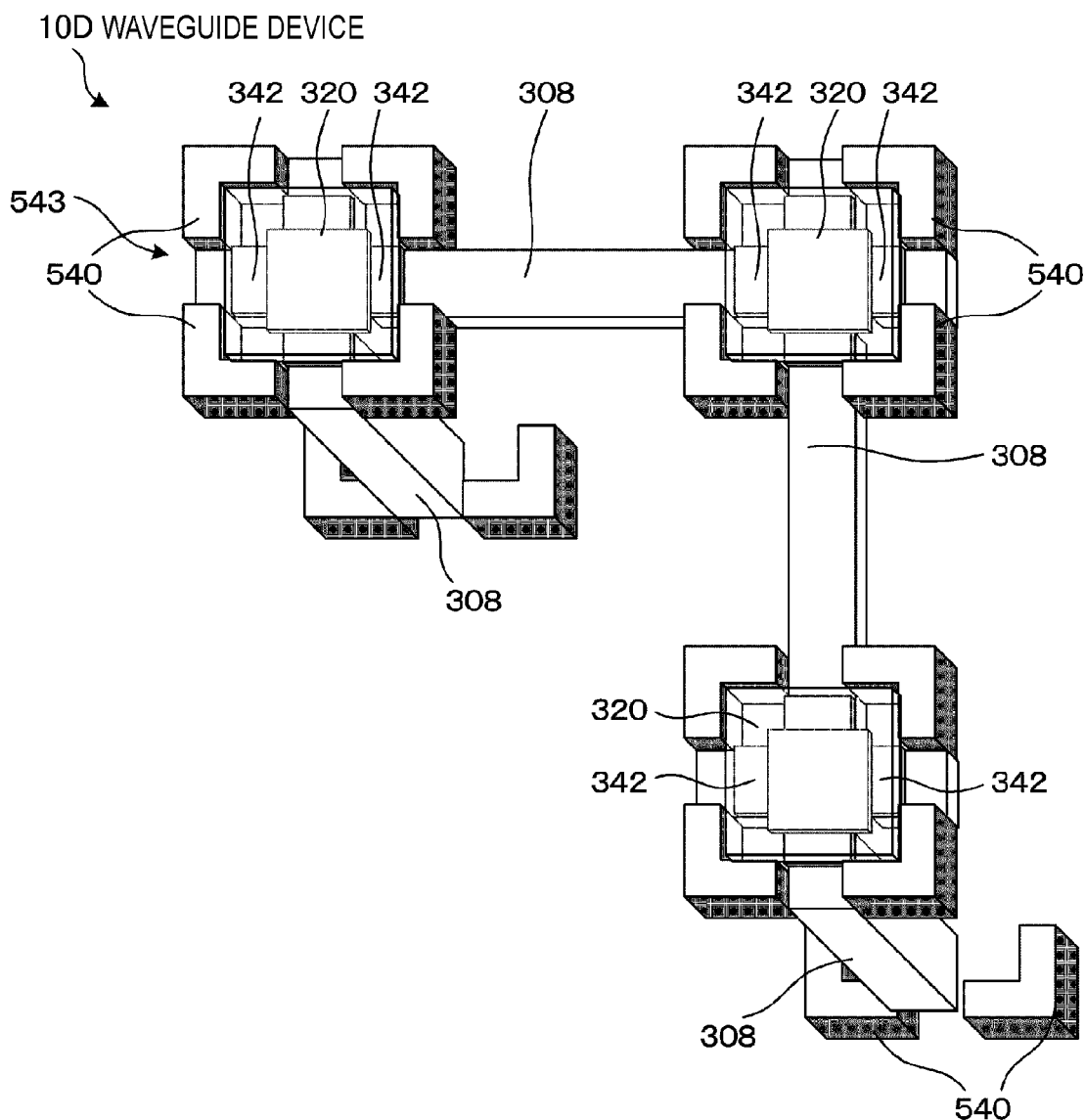
FIG. 15 is a diagram (partial perspective view) illustrating the waveguide device of the embodiment 4 to which a signal transmission device of this embodiment is applied.

FIG. 15 is a diagram illustrating a waveguide device of the embodiment 4 to which a signal transmission device of this embodiment is applied, and is a partial perspective view thereof. Although not illustrated, it is possible to configure an electronic device 300D of the embodiment 4 by installing the waveguide device 10D of the embodiment 4. Also in the embodiment 4, although not illustrated, the high-frequency signal waveguide 308 is attachable and detachable, and is removed as for an unnecessary connection relationship.

The embodiment 4 is an aspect in which a signal processing module 320 is arranged in the module mounting region 543 of a lattice point of a waveguide arranged in a rectangle (regular square shape) and a three-dimensional shape. Any fixing method can be employed when the signal processing module 320 is arranged three-dimensionally. As in the embodiment 2, the normal signal processing module 320 and the relay module 328 may be alternately arranged. The waveguide device 10D of the above-described embodiment 4 includes a transmission network formed by a three-dimensional single-length waveguide and the signal processing module 320 (including the relay module 328) having the communication function. Although there is a difference between a two-dimensional shape and a three-dimensional shape, it is possible to basically have effects similar to those of the above-described embodiment 1 or 2. There is also an advantage in that it is possible to exhibit a function design characteristic by forming a three-dimensional shape.

Embodiment 5

Although the technology disclosed in this specification has been described above using the embodiments, the technical scope of the contents described in the appended claims is not limited to the scope of the description of the above-described embodiments. Various changes and improvements can be made in the above-described embodiments without departing from the subject matter of the technology disclosed in this specification, and forms in which such changes and improvements are made are also contained within the technical scope of the technology disclosed in this specification. The above-described embodiments do not limit the technology according to the claims, and all of combinations of the features described in the embodiments are not indispensable for solving the problems that the technology disclosed in this specification is to solve. Various stages of technology are contained in the above-described embodiments and a variety of technology can be extracted based on suitable combinations in a plurality of disclosed constituent requirements. Even when some among the configuration requirements described in the embodiments are deleted, the resulting configurations can also be implemented as technology described in this specification, as long as the effects corresponding to the problems to be solved by the technology disclosed in this specification are obtained.

REFERENCE SIGNS LIST 1 signal transmission device
10 waveguide device
300 electronic device
302 central control unit
308 high-frequency signal waveguide
320 signal processing module
328 relay module
342 high-frequency signal coupling structure
540 module fixing wall
543 module mounting region
580 waveguide wall
582 waveguide wall
586 waveguide wall layer
588 waveguide wall layer

The invention claimed is:

1. A waveguide device comprising:
 a signal processing module configured to communicate with another signal processing module;
 an attachment/detachment unit configured to attach/detach to a high-frequency signal waveguide, wherein the attachment/detachment unit is further configured to mount the signal processing module using module fixing walls such that the mounted signal processing module is coupled to the high-frequency signal waveguide attached to the attachment/detachment unit; and
 a control unit configured to:
  recognize a function of the signal processing module based on a data transmission between the signal processing module and the control unit;
  change configuration information based on the recognized function of the signal processing module; and
  control a data transmission between the signal processing module and the another signal processing module according to the changed configuration information.

2. The waveguide device according to claim 1, wherein a position of the attachment/detachment unit in the waveguide device is a vertex of a predetermined planar shape or a predetermined three-dimensional shape formed by a plurality of the high-frequency signal waveguides.

3. The waveguide device according to claim 1, wherein the attachment/detachment unit is configured to decouple each of a plurality of the high-frequency signal waveguides from another of the plurality of the high-frequency signal waveguides.

4. The waveguide device according to claim 1, wherein the mounted signal processing module is a relay module configured to relay data to the another signal processing module.

5. The waveguide device according to claim 1, wherein the high-frequency signal waveguide connected to the attachment/detachment unit includes a plurality of independent transmission paths.

6. The waveguide device according to claim 5, wherein a plurality of members constituting the plurality of independent transmission paths are arranged in parallel in the high-frequency signal waveguide.

7. The waveguide device according to claim 5, wherein a plurality of members constituting the plurality of independent transmission paths are laminated.

8. The waveguide device according to claim 5, wherein a plurality of members constituting the plurality of independent transmission paths have different permittivities, wherein a wall layer of a permittivity different from any of the permittivities is arranged between the plurality of members constituting the adjacent independent transmission paths, and wherein an opening is provided in a part of the wall layer.

9. The waveguide device according to claim 1, wherein a planar shape or a three-dimensional shape formed by a plurality of the high-frequency signal waveguides is predetermined.

10. The waveguide device according to claim 9, wherein a basic shape is a unit constituting the planar shape or the three-dimensional shape, wherein the basic shape is one of a regular triangle, a regular square, and a regular hexagon.

11. The waveguide device according to claim 1, wherein the mounted signal processing module transmits data to the another signal processing module in the waveguide device via the high-frequency signal waveguide attached to the attachment/detachment unit.

12. The waveguide device according to claim 1, wherein the control unit senses a position of the attachment/detachment unit in an arrangement of a plurality of the attachment/detachment units.

13. The waveguide device according to claim 1, wherein the control unit senses whether the signal processing module is coupled to the high-frequency signal waveguide.

14. The waveguide device according to claim 1, wherein the mounted signal processing module is a relay module configured to transfer data from a first signal processing module to a second signal processing module.

15. The waveguide device according to claim 1,
 wherein a plurality of members, constituting a plurality of independent transmission paths in the high-frequency signal waveguide, have different permeabilities,
 wherein a wall layer of a permeability different from any of the permeabilities is arranged between the plurality of members constituting the adjacent independent transmission paths, and
 wherein an opening is provided in a part of the wall layer.

16. An electronic device comprising:
 a signal processing module configured to communicate with another signal processing module;
 an attachment/detachment unit configured to attach/detach to a high-frequency signal waveguide so that the signal processing module is coupled to the high-frequency signal waveguide attached to the attachment/detachment unit; and
 a control unit configured to change configuration information based on change in coupling of the signal processing module to the high-frequency signal waveguide, and to control data transmission according to the changed configuration information.

17. A waveguide device comprising:
 a module configured to communicate with another module; and an attachment/detachment unit configured to attach/detach a high-frequency signal waveguide, wherein the high-frequency signal waveguide connected to the attachment/detachment unit includes a plurality of independent transmission paths, wherein members constituting the plurality of independent transmission paths have different permeabilities, a wall layer of a permeability different from any of the permeabilities is arranged between the members constituting adjacent transmission paths, and an opening is provided in a part of the wall layer.

* * * * *